US012750715B2

(12) United States Patent
Kim

(10) Patent No.: US 12,750,715 B2
(45) Date of Patent: Sep. 29, 2026

(54) METHOD AND APPARATUS FOR REQUESTING AND CONFIGURING GAP CONFIGURATION RELATED TO BANDWIDTH PART IN WIRELESS MOBILE COMMUNICATION SYSTEM

(71) Applicants: Blackpin Inc., Seoul (KR); Soenghun Kim, Hanam-si (KR)

(72) Inventor: Soenghun Kim, Hanam-si (KR)

(73) Assignees: BLACKPIN INC., Seoul (KR); Soenghun Kim, Hanam-si (KR)

(*) Notice: Subject to any disclaimer, the term of this patent is extended or adjusted under 35 U.S.C. 154(b) by 225 days.

(21) Appl. No.: 18/716,306

(22) PCT Filed: Jan. 18, 2023

(86) PCT No.: PCT/KR2023/000893
§ 371 (c)(1),
(2) Date: Jun. 4, 2024

(87) PCT Pub. No.: WO2023/140623
PCT Pub. Date: Jul. 27, 2023

(65) Prior Publication Data

US 2025/0048154 A1 Feb. 6, 2025

(30) Foreign Application Priority Data

Jan. 24, 2022 (KR) ........................ 10-2022-0009783

(51) Int. Cl.
*H04W 24/10* (2009.01)
*H04W 72/23* (2023.01)

(52) U.S. Cl.
CPC ........... *H04W 24/10* (2013.01); *H04W 72/23* (2023.01)

(58) Field of Classification Search
CPC ..... H04W 24/10; H04W 72/23; H04W 72/04; H04W 72/21; H04W 72/51
See application file for complete search history.

(56) References Cited

U.S. PATENT DOCUMENTS 12,238,559 B2 * 2/2025 Cui ........................ H04W 24/10
2021/0226750 A1 * 7/2021 Cheng ................... H04L 5/0032

FOREIGN PATENT DOCUMENTS

WO WO 2020222172 11/2020
WO WO-2020222172 A1 * 11/2020 ........ H04W 36/0058

OTHER PUBLICATIONS

3rd Generation Partnership Project; Technical Specification Group Radio Access Network; NR; Medium Access Control (MAC) protocol specification (Release 16), 3GPP TS 38.321 V16.7.0, Dec. 2021, 158 pages.

(Continued)

*Primary Examiner* — Charles C Jiang
*Assistant Examiner* — Rachel Elizabeth Cerlanek
(74) *Attorney, Agent, or Firm* — Nicholas Park

(57) ABSTRACT

According to an embodiment of the present disclosure, a method for user equipment in a wireless communication system may comprise the steps of: user equipment receiving RRCReconfiguration from a base station; if MeasGapConfig includes first gap configuration information, the user equipment setting up a first gap, and if the MeasGapConfig includes second gap configuration information, the user equipment setting up a second gap; and the user equipment activating the first gap or the second gap.

20 Claims, 11 Drawing Sheets

(56) References Cited

OTHER PUBLICATIONS

3rd Generation Partnership Project; Technical Specification Group Radio Access Network; NR; Radio Resource Control (RRC) protocol specification (Release 16), 3GPP TS 38.331 V16.7.0, Dec. 2021, 963 pages.
3rd Generation Partnership Project; Technical Specification Group Radio Access Network; NR; Requirements for support of radio resource management (Release 16), 3GPP TS 38.133 V16.10.0, Dec. 2021, 3249 pages.
Ericsson, "Miscellaneous non-controversial corrections Set IX," R2-2102381, 3GPP TSG-RAN WG2 Meeting #113e, Electronic Meeting, Jan. 25-Feb. 5, 2021, 909 pages.
International Search Report in International Appln. No. PCT/KR2023/000893, mailed on Mar. 23, 2024, 4 pages (with English translation).
Media Tek Inc., "Discussion on pre-configured gap," R4-2112392, 3GPP TSG-RAN WG4 Meeting #100-e, Electronic Meeting, Aug. 16-27, 2021, 6 pages.
Nokia et al., "UL gaps for FR2," R2-2109798, 3GPP TSG-RAN WG2 Meeting #116 Electronic. Elbonia, Nov. 1-12, 2021, 44 pages.

* cited by examiner

```
MeasGapConfig ::=                SEQUENCE {
    gapFR2                       SetupRelease { GapConfig }          OPTIONAL
    ...,
    [[                first extended part of MeasGapConfig      1g-03
    gapFR1                       SetupRelease { GapConfig }          OPTIONAL
    gapUE                        SetupRelease { GapConfig }          OPTIONAL
    ]],
    [[                second extended part of MeasGapConfig     1g-05
    gapBwpToRemoveList           GapBwpToRemoveList                  OPTIONAL
    gapBwpToAddModList           GapBwpToAddModList                  OPTIONAL
    gapFRorUEToRemoveList        GapFRorUEToRemoveList               OPTIONAL
    gapFRorUEToAddModList        GapFRorUEToAddModList               OPTIONAL
    ]]
```

```
GapConfig ::=                    SEQUENCE {
    gapoffset                    INTEGER (0..159),
    mgl                          ENUMERATED {ms1dot5, ms3, ms3dot5, ms4, ms5dot ..}
    mgrp                         ENUMERATED {ms20, ms40, ms80, ms160},
    mgrp                         ENUMERATED {ms0, ms0dot25, ms0dot5},
    ...,
    [[                first extended part of GapConfig          1g-07
    refServCellIndicator         ENUMERATED {pCell, pSCell, mcg-FR2}
    ]],
    [[                second extended part of GapConfig         1g-09
    refFR2ServCellAsyncCA-r16    ServCellIndex
    mgl2                         ENUMERATED {ms10, ms20}             OPTIONAL
    ]],
    ncsIndicator                 ENUMERATED {True}                   OPTIONAL
    interruptedSlot              ENUMERATED {s1, s2},                OPTIONAL
    gapOffset2                   INTEGER (160..1279),                OPTIONAL
    mgrp2                        ENUMERATED {ms640, ms1280},         OPTIONAL
    ]]                third extended part of GapConfig          1g-11
}
```

```
GapBwpToRemoveList ::=           SEQUENCE (SIZE (1..maxNrofGapId) ) OF GapId

GapBwpToAddModList ::=           SEQUENCE (SIZE (1..maxNrofGapId) ) OF GapBwpToAddMod

GapBwpToAddMod ::=               SEQUENCE {
    gapBwpId                     GapId,
    gapoffset                    INTEGER (0..159),
    mgl3                         ENUMERATED {ms1dot5, ms3, ms3dot5, ms4, ms5dot5, ms6, ms10, ..}
    mgrp                         ENUMERATED {ms20, ms40, ms80, ms160},
    mgta                         ENUMERATED {ms0, ms0dot25, ms0dot5},
    AssociatedBWP                BIT STRING (SIZE (maxNrofDLBwp) )   OPTIONAL
    gapPurpose                   ENUMERATED {ssb, csi-rs, prs}       OPTIONAL
    ...,
}

GapFRorUEToRemoveList ::=        SEQUENCE (SIZE (1..maxNrofGapId) ) OF GapId
}
GapFRorUEToAddModList ::=        SEQUENCE (SIZE (1..maxNrofGapId) ) OF GapFRorUEToAddMod

GapFRorUEToAddMod ::=            SEQUENCE {
    gapId                        GapId,
    gapType                      ENUMERATED {gapFR2, gapFR1, gapUE},
    gapOffset                    INTEGER (0..159),
    mgl3                         ENUMERATED {ms1dot5, ms3, ms3dot5, ms4, ms5dot5, ms6, ms10, ..}
    mgrp                         ENUMERATED {ms20, ms40, ms80, ms160},
    mgta                         ENUMERATED {ms0, ms0dot25, ms0dot5},
    ...,
}
```

FIG.1G

```
Musim-GapConfig ::=                SEQUENCE {
    musim-GapConfigToRemoveList    musim-GapConfigToRemoveList        OPTIONAL
    musim-GapConfigToAddModList    musim-GapConfigToAddModList        OPTIONAL
}

Musim-GapConfigToRemoveList ::=          SEQUENCE (SIZE (1..maxNrofGapId) ) OF Musim-GapId

Musim-GapConfigToAddModList ::=          SEQUENCE (SIZE (1..maxNrofGapId) ) OF Musim-GapConfigToAddMod

Musim-GapConfigToAddMod ::=        SEQUENCE {                                        1h-11
    musim-gapId                    GapId,
    musim-gaptype                  ENUMERATED {periodic, aperiodic},
    gapoffset                      INTEGER (0..159),          OPTIONAL
    mgl3                           ENUMERATED {ms1dot5, ms3, ms3dot5, ms4, ms5dot5, ms6, ms10, ms20},
OPTIONAL
    mgrp                           ENUMERATED {ms20, ms40, ms80, ms160},        OPTIONAL
    mgta                           ENUMERATED {ms0, ms0dot25, ms0dot5},         OPTIONAL
    gapOffset3                     INTEGER (160..10239),           OPTIONAL
    mgl4                           ENUMERATED {ms32, ms64, ms128, ms256},       OPTIONAL
    mgrp2                          ENUMERATED {sf64, sf128, sf256, sf512},      OPTIONAL
    mgn                            ENUMERATED {one, two, four, eight},          OPTIONAL
    ...,
}
```

FIG.1H

METHOD AND APPARATUS FOR REQUESTING AND CONFIGURING GAP CONFIGURATION RELATED TO BANDWIDTH PART IN WIRELESS MOBILE COMMUNICATION SYSTEM

CROSS-REFERENCE TO RELATED APPLICATIONS

This application is a National Stage application under 35 U.S.C § 371 of International Application No. PCT/KR2023/000893, filed on Jan. 18, 2023, which claims priority to and the benefit of Korean Patent Application No. 10-2022-0009783, filed on Jan. 24, 2022. The disclosures of the prior applications are incorporated by reference in their entirety.

TECHNICAL FIELD

The present disclosure relates to requesting and activating gap configuration related to bandwidth part by a terminal in wireless mobile communication system.

BACKGROUND ART

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

Various attempts are being made to apply 5G communication systems to IoT networks. For example, 5G communications such as sensor networks, M2M, and MTC are being implemented using techniques such as beamforming, MIMO, and array antennas.

As the uses of terminals diversify, the need to control the operation of terminals by applying various gaps according to circumstances is emerging. For example, it is necessary to set a gap for measurement, a gap for MUSIM operation, or a gap for transmission power control so that the operation of the terminal can proceed efficiently.

DETAILED DESCRIPTION OF THE INVENTION

Technical Problem

The disclosed embodiments are intended to provide method and apparatus for requesting and activating gap configuration related to bandwidth part by a terminal in wireless mobile communication system.

Technical Solution

According to one embodiment of the present disclosure, in a method of a terminal, the method includes transmitting a UECapabilityInformation message including a plurality of first single-valued IEs indicating whether the terminal supports type2Gap to the base station, receiving a first message including information about a gap request including a plurality of frequency band indicators and a second single value IE from the base station, transmitting a second message including gap-related information to the base station, receiving a third message including information for gap configuration from the base station, setting up a gap based on the gap configuration information and performing a first gap operation during the gap.

Advantageous Effects

The disclosed embodiments provides method and apparatus for requesting and activating gap configuration related to bandwidth part by a terminal in wireless mobile communication system.

FIG. IE is a diagram illustrating various gaps.

Figure 1A:
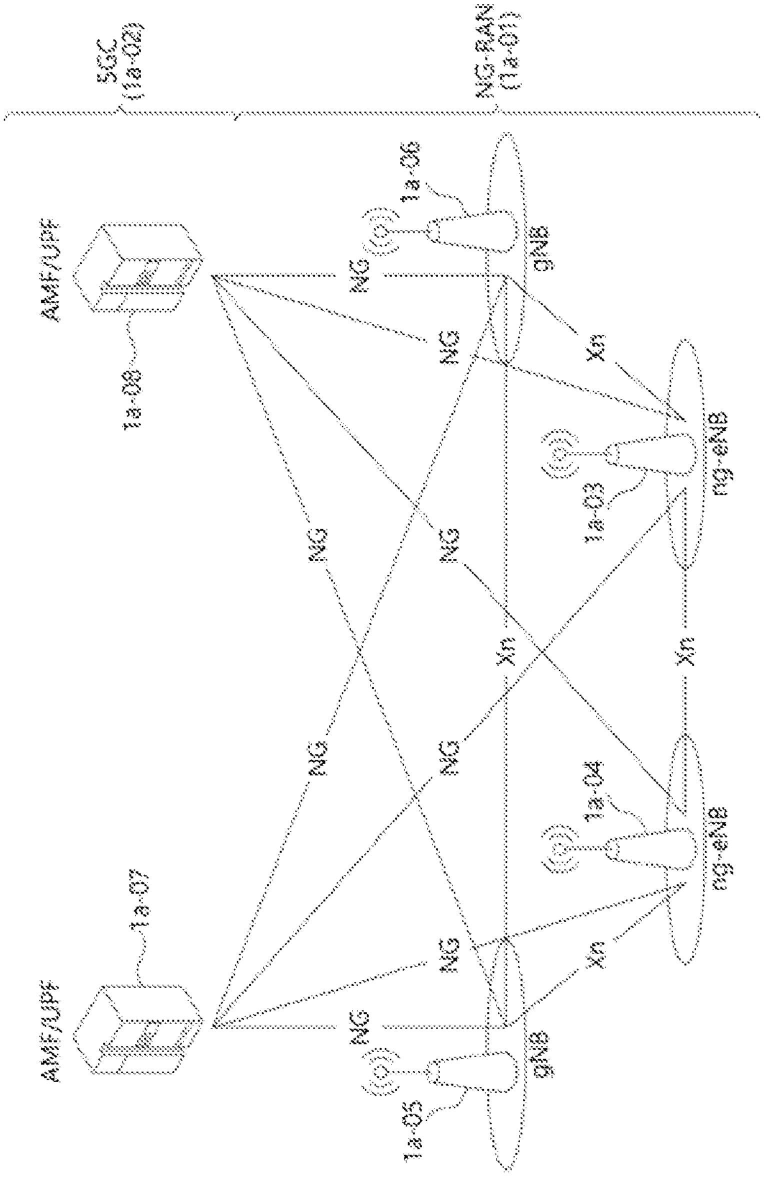
FIG. 1A is a diagram illustrating the architecture of an 5G system and a NG-RAN to which the disclosure may be applied.
Figure 1B:
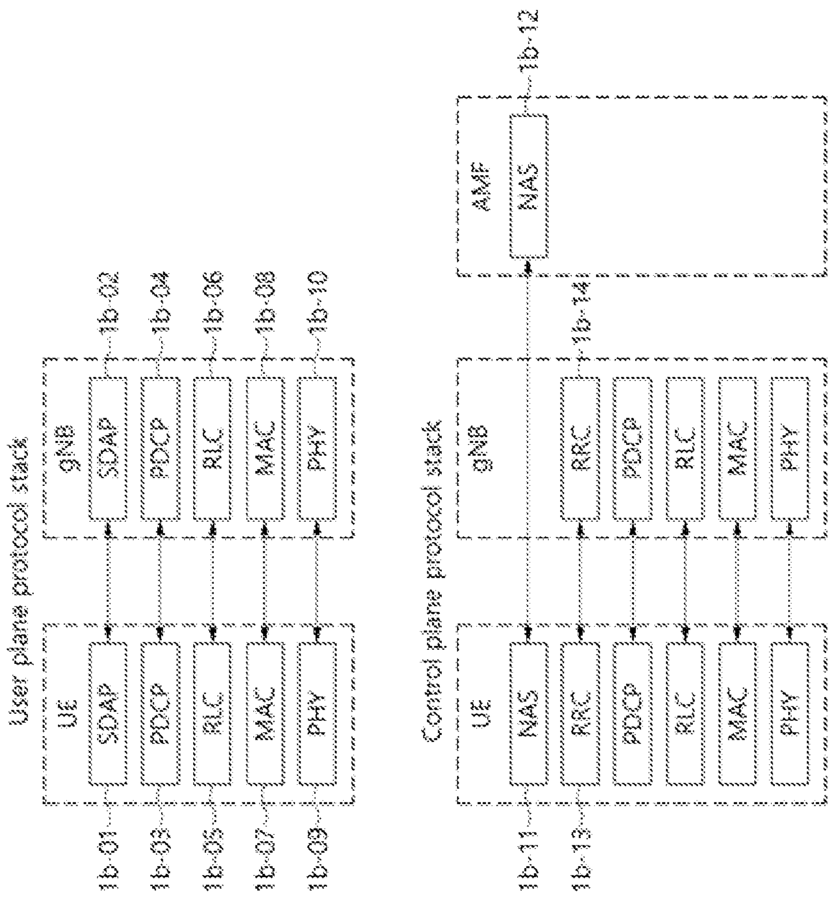
FIG. 1B is a diagram illustrating a wireless protocol architecture in an 5G system to which the disclosure may be applied.
Figure 1C:
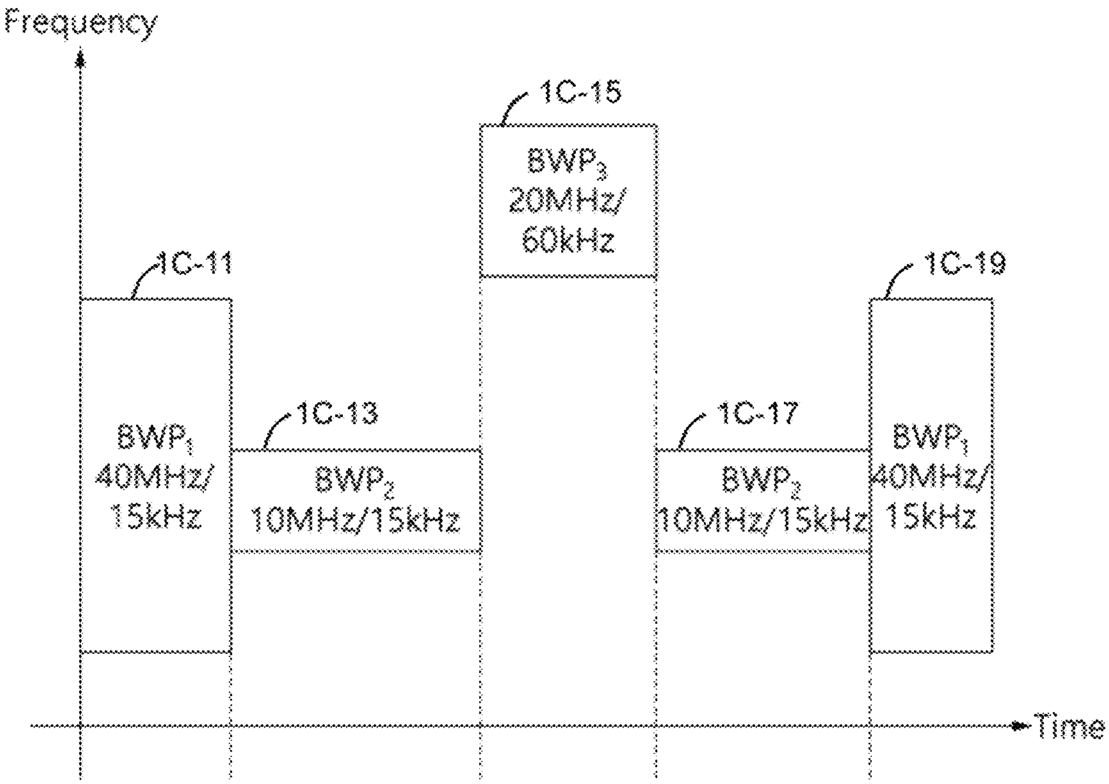
FIG. 1C is a diagram illustrating an example of a bandwidth part.
Figure 1D:
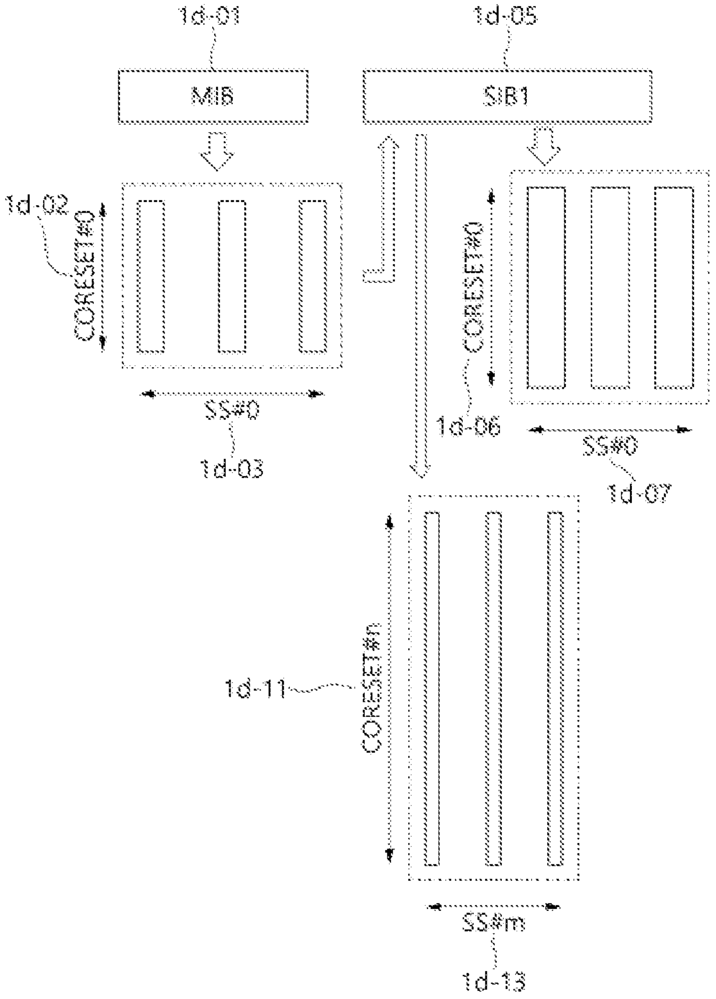
FIG. 1D is a diagram illustrating an example of a search space and a control resource set.
Figure 1E:
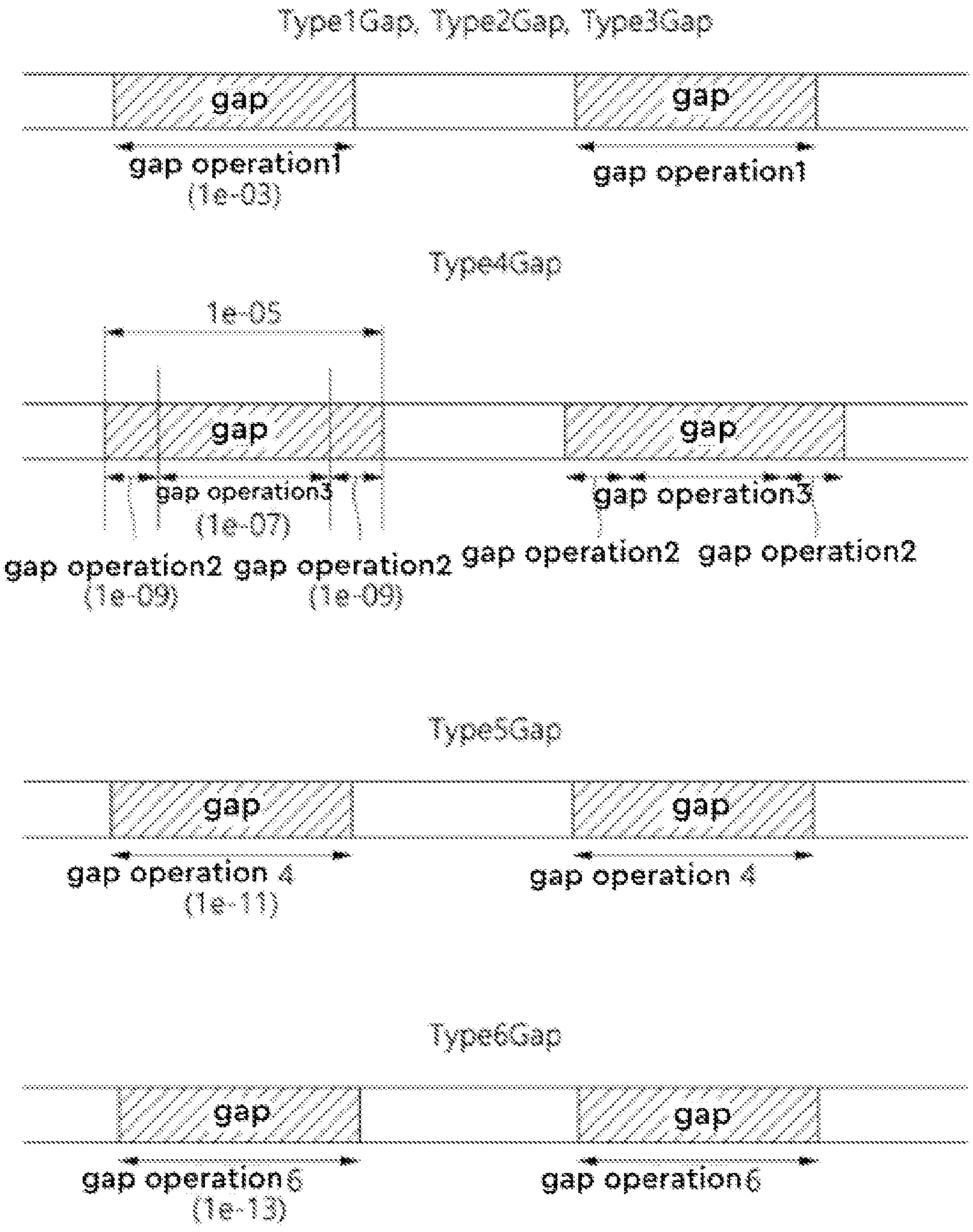
Figure 1F:
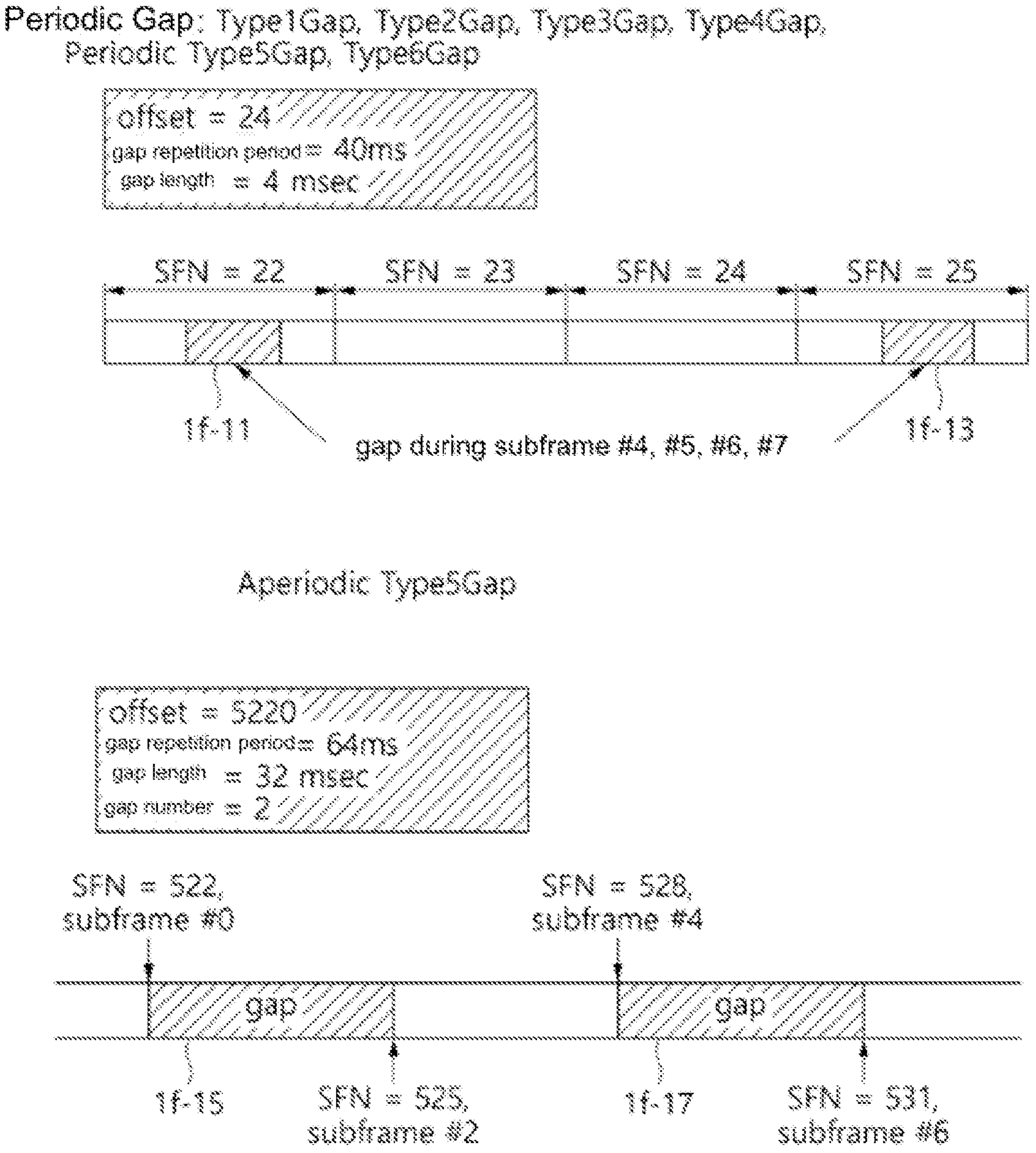

FIG. 1F is a diagram illustrating gap patterns of various gaps.

FIG. 1G is a diagram illustrating ASN.1 structure of IE configuring various gaps.

FIG. 1H is a diagram illustrating ASN.1 structure of IE configuring Type5Gap.

Figure 2:
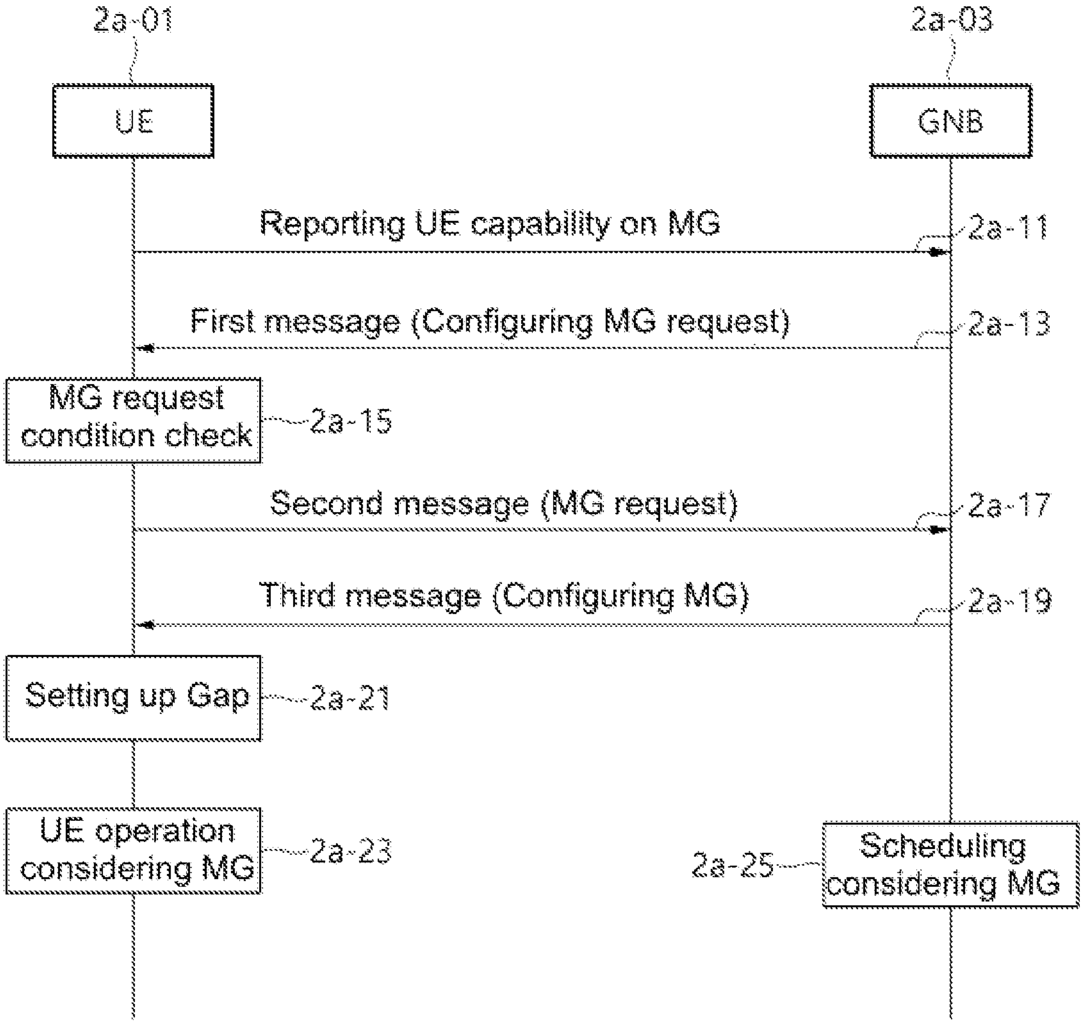

FIG. 2 is a diagram illustrating operations of a terminal and a base station according to an embodiment of the present invention.

Figure 3:
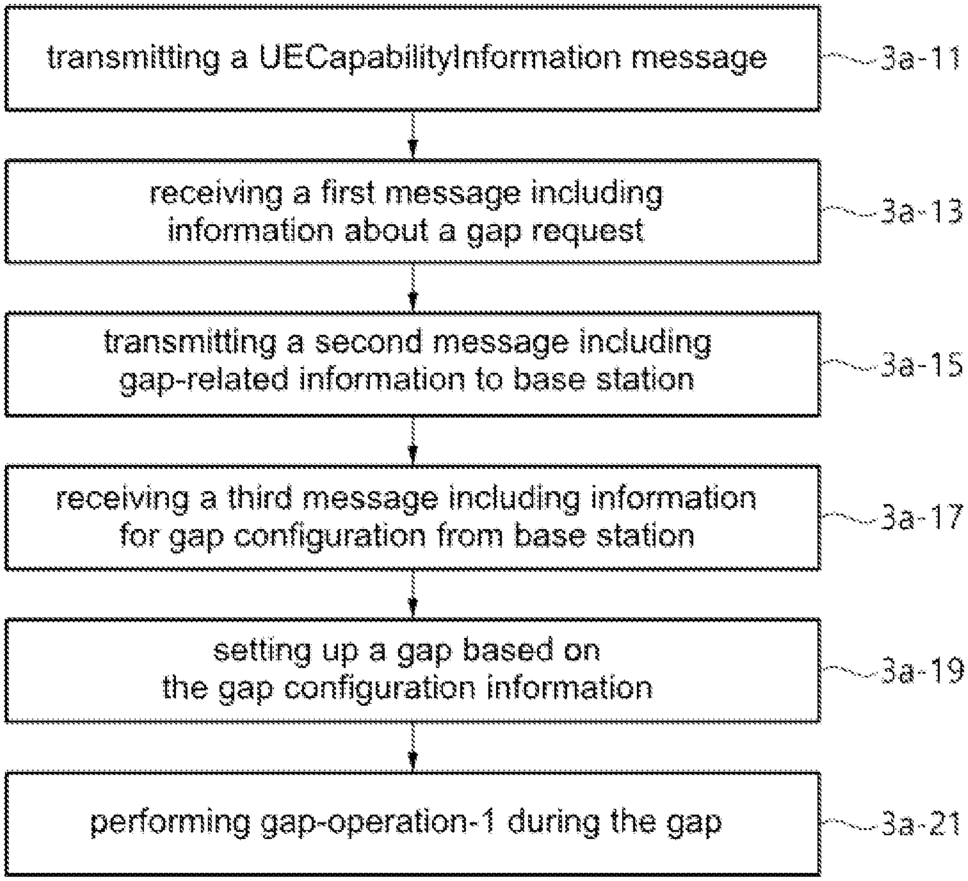

FIG. 3 is a flow diagram illustrating an operation of a terminal.

Figure 4A:
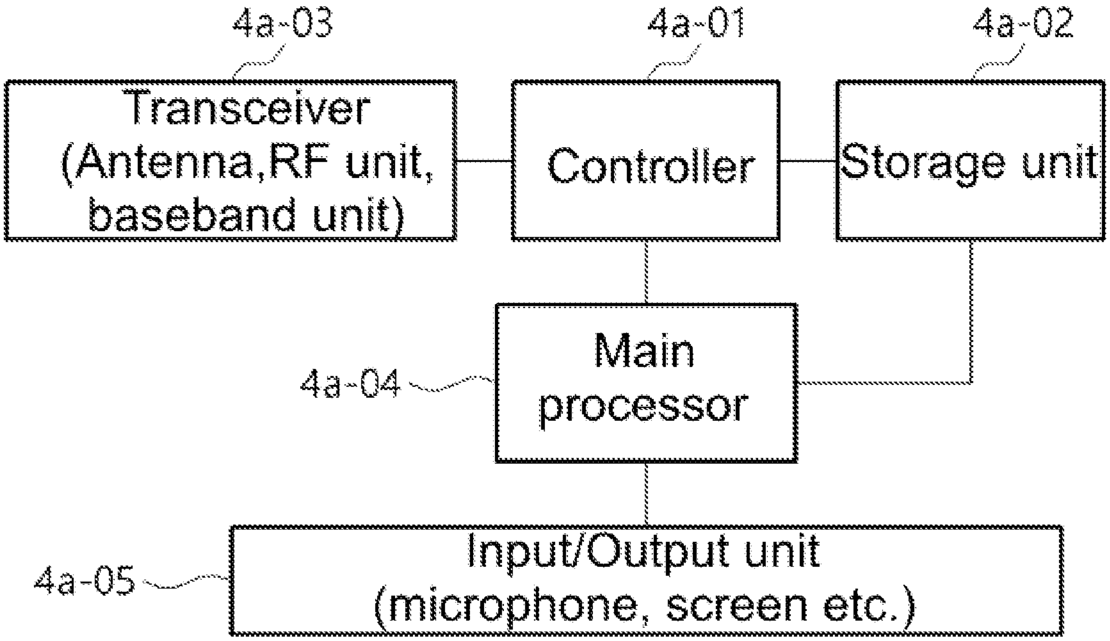

FIG. 4A is a block diagram illustrating the internal structure of a UE to which the disclosure is applied.

Figure 4B:
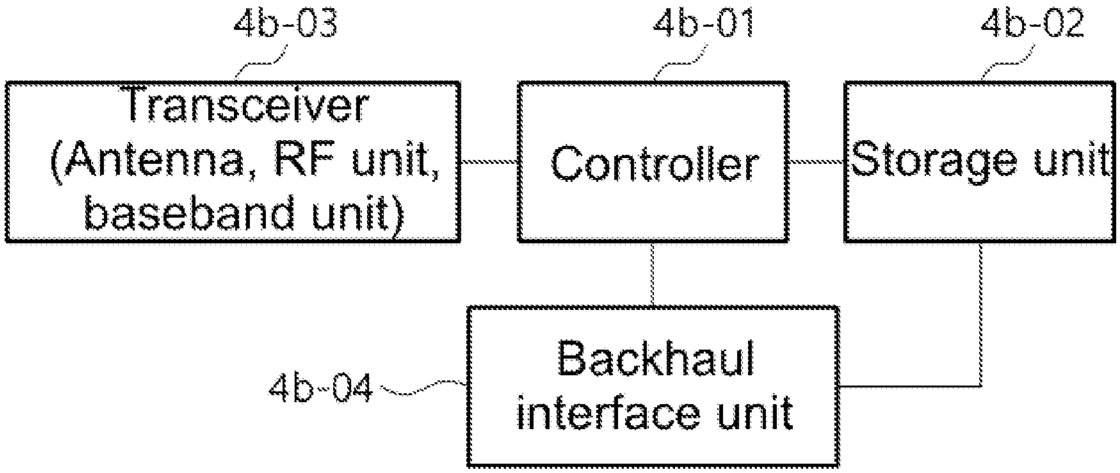

FIG. 4B is a block diagram illustrating the configuration of a base station according to the disclosure.

MODE FOR CARRYING OUT THE INVENTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DRX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CRP | Cell Reselection Priority |
| PRB | Physical Resource Block | MUSIM | Multi-Universal Subscriber Identity Module |
| PSS | Primary Synchronisation Signal | CCCH | Common Control Channel |
| PUCCH | Physical Uplink Control Channel | CSI-RS | Channel State Information - Reference Signal |
| PUSCH | Physical Uplink Shared Channel | | |

Table 2 lists the terminologies and their definition used throughout the present disclosure.

TABLE 2

| Terminology | Definition |
|---|---|
| Carrier frequency | center frequency of the cell. |

TABLE 2-continued

| Terminology | Definition |
|---|---|
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Cell Reselection Priority | Priority of a carrier frequency regarding cell reselection. System Information Block 2 and System Information Block 3 provide the CRP of the serving frequency and CRPs of inter-frequency respectively. UE consider higher priority frequency for cell reselection if channel condition of the frequency is better than a specific threshold even if channel condition of a lower priority frequency is better than that of the higher priority frequency. |
| Dedicated signalling | Signalling sent on DCCH logical channel between the network and a single UE. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| NR | NR radio access |
| PCell | SpCell of a master cell group. |
| Registered PLMN | PLMN which UE has registered to |
| Selected PLMN | PLMN which UE has selected to perform registration procedure |
| Equivalent PLMN | PLMN which is equivalent to registered PLMN. UE is informed of list of EPLMNs by AMF during registration procedure. |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |

TABLE 2-continued

| Terminology | Definition |
|---|---|
| CCCH | CCCH is a logical channel to transfer initial RRC message such as RRCSetupRequest, RRCResumeRequest and RRCSetup |
| DCCH | DCCH is a logical channel to transfer RRC messages after RRC connection establishment |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |

In the present invention, "trigger" or "triggered" and "initiate" or "initiated" may be used in the same meaning.

In the present invention, terminal with reduced capability and RedCap UE may be used interchangeably.

FIG. 1A is a diagram illustrating the architecture of an 5G system and a NG-RAN to which the disclosure may be applied. 5G system consists of NG-RAN 1A-01 and 5GC 1A-02. An NG-RAN node is one o following two.

1: a gNB, providing NR user plane and control plane protocol terminations towards the UE; or 2: an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink (scheduling), IP and Ethernet header compression, encryption of user data stream, Selection of an AMF at UE attachment when no routing to an AMF can be determined from the information provided by the UE, Routing of User Plane data towards UPF, Scheduling and transmission of paging messages, Scheduling and transmission of broadcast information (originated from the AMF or O&M);

Measurement and measurement reporting configuration for mobility and scheduling, Session Management, QoS Flow management and mapping to data radio bearers, Support of UEs in RRC_INACTIVE state, Radio access network sharing;

Tight interworking between NR and E-UTRA, Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QOS handling and the downlink, mobility anchoring for mobility etc.

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sub-layer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

FIG. 1C is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one. FIG. 2 describes a scenario where 3 different BWPs are configured as below.

BWP1 with a width of 40 MHz and subcarrier spacing of 15 kHz; 1C-11 or 1C-19

BWP2 with a width of 10 MHz and subcarrier spacing of 15 kHz; 1C-13 or 1C-17

BWP3 with a width of 20 MHz and subcarrier spacing of 60 kHz. 1C-15

FIG. 1D is a diagram illustrating an example of a search space and a control resource set.

A plurality of SSs may be configured in one BWP. The UE monitors PDCCH candidates according to the SS configuration of the currently activated BWP. One SS consists of an SS identifier, a CORESET identifier indicating the associated CORESET, the period and offset of the slot to be monitored, the slot unit duration, the symbol to be monitored in the slot, the SS type, and the like. The information may be explicitly and individually configured or may be configured by a predetermined index related to predetermined values.

One CORESET consists of a CORESET identifier, frequency domain resource information, symbol unit duration, TCI status information, and the like.

Basically, it can be understood that CORESET provides frequency domain information to be monitored by the UE, and SS provides time domain information to be monitored by the UE.

CORESET #0 and SS #0 may be configured in the IBWP. One CORESET and a plurality of SSs may be additionally configured in the IBWP. Upon receiving the MIB 1D-01, the UE recognizes CORESET #0 1D-02 and SS #0 1D-03 for receiving SIB1 using predetermined information included in the MIB. The UE receives SIB1 1D-05 through CORESET #0 1D-02 and SS #0 1D-03. In SIB1, information constituting CORESET #0 1D-06 and SS #0 1D-07 and information constituting another CORESET, for example, CORESET #n 1D-11 and SS #m 1D-13 may be included. The terminal receives necessary information from the base station before the terminal enters the RRC_CONNECTED state, such as SIB2 reception, paging reception, and random access response message reception by using the CORESETs and SSs configured in SIB1. CORESET #0 1D-02 configured in MIB and CORESET #0 1D-06 configured in SIB1 may be different from each other, and the former is called a first CORESET #0 and the latter is called a second CORESET #0. SS #0 1D-03 configured in MIB and SS #0 1D-07 configured in SIB1 may be different from each other, and the former is referred to as a first SS #0 and the latter is referred to as a second SS #0. SS #0 and CORESET #0 configured for the RedCap terminal are referred to as a third SS #0 and a third CORESET #0. The first SS #0, the second SS #0, and the third SS #0 may be the same as or different from each other. The first CORESET #0, the second CORESET #0, and the third CORESET #0 may be the same as or different from each other. SS #0 and CORESET #0 are each indicated by a 4-bit index. The 4-bit index indicates a configuration predetermined in the standard specification. Except for SS #0 and CORESET #0, the detailed configuration of the remaining SS and CORSESET is indicated by each individual information element.

When the RRC connection is established, additional BWPs may be configured for the UE.

A Serving Cell may be configured with one or multiple BWPs.

UE can be configured with one or more DL BWPs and one or more UL BWPs in a serving cell. If the serving cell operates in paired spectrum (i.e., FDD band), the number of DL BWPs and the number of UL BWPs can be different. If the serving cell operates in unpaired spectrum (i.e., TDD band), the number of DL BWPs and the number of UL BWPs is same.

SIB1 includes a DownlinkConfigCommonSIB and a UplinkConfigCommonSIB and a tdd-UL-DL-ConfigurationCommon.

tdd-UL-DL-ConfigurationCommon is cell specific TDD UL/DL configuration. It consists of subfields such as referenceSubcarrierSpacing, pattern1, and pattern2.

referenceSubcarrierSpacing is the reference SCS used to determine the time domain boundary in the UL-DL pattern.

pattern1 and pattern2 are TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols.

dl-UL-TransmissionPeriodicity indicates the period of the DL-UL pattern.

nrofDownlinkSlots indicates the number of consecutive full DL slots in each DL-UL pattern.

nrofDownlinkSymbols indicates the number of consecutive DL symbols from the beginning of the slot following the last full DL slot.

nrofUplinkSlots indicates the number of consecutive full UL slots in each DL-UL pattern.

nrofUplinkSymbols indicates the number of consecutive UL symbols at the last time point of a slot preceding the first full UL slot.

slots between the last full DL slot and the first full UL slot are flexible slots. full UL slot is also called static UL slot. UL slot in this disclosure is static UL slot.

DownlinkConfigCommonSIB includes BWP-DownlinkCommon IE for initial DL BWP. UplinkConfigCommonSIB includes BWP-UplinkCommon IE for initial UL BWP. BWP-id of initialDownlinkBWP is 0.

A RRCReconfiguration message includes one or more BWP-Downlink and one or more BWP-Uplink and a firstActiveDownlinkBWP-Id and a bwp-Inactivity Timer and a defaultDownlinkBWP-Id and a BWP-DownlinkDedicated for the initial DL BWP.

A BWP-Downlink IE includes a bwp-Id and a BWP-DownlinkCommon and a BWP-DownlinkDedicated.

A BWP-Uplink IE includes a bwp-Id and a BWP-UplinkCommon and a BWP-UplinkDedicated.

The bwp-Id is an integer between 0 and 4. bwp-Id 0 is used only for the BWP indicated in SIB1. bwp-Id1~ 4 can be used for the BWPs indicated in the RRCReconfiguration message.

BWP-DownlinkCommon IE includes following information: Frequency domain location and bandwidth of this bandwidth part, subcarrier spacing to be used in this BWP, cell specific parameters for the PDCCH of this BWP, cell specific parameters for the PDSCH of this BWP.

BWP-UplinkCommon IE includes following information: Frequency domain location and bandwidth of this bandwidth part, subcarrier spacing to be used in this BWP, cell specific parameters for the PUCCH of this BWP, cell specific parameters for the PUSCH of this BWP, Configuration of cell specific random access parameters.

BWP-DownlinkDedicated is used to configure the dedicated (UE specific) parameters of a downlink BWP. It includes cell specific parameters for the PDCCH of this BWP, cell specific parameters for the PDSCH of this BWP.

The BWP-UplinkDedicated is used to configure the dedicated (UE specific) parameters of an uplink BWP.

firstActiveDownlinkBWP-Id contains the ID of the DL BWP to be activated upon performing the RRC (re-)configuration.

defaultDownlinkBWP-Id is the ID of the downlink bandwidth part to be used upon expiry of the BWP inactivity timer.

bwp-Inactivity Timer is the duration in ms after which the UE falls back to the default Bandwidth Part FIG. IE is a diagram illustrating various gaps.

In this disclosure six gaps are defined: Type1Gap, Type2Gap, Type3Gap, Type4Gap, Type5Gap and Type6Gap.

Type1Gap is used for RRM measurement on all FR1 frequencies or on all FR2 frequencies or on all frequencies. Type1Gap is always activated once it is configured. During a Type1Gap 1E-03, UE performs gap operation1.

Type2Gap is used for RRM measurement on all frequencies. Type2Gap is activated only when an associated BWP is activated (or deactivated). During a Type2Gap 1E-03, UE performs gap operation1-1. A Type2Gap can be called preconfigured gap.

Type3Gap is used for RRM measurement on specific frequency (or frequencies). Type3Gap is always activated once it is configured. During a Type3Gap 1E-03, UE performs gap operation1-1. A Type3Gap can be called concurrent gap. A type3Gap is associated with a frequency if the ID of the type3Gap is indicated in the measurement object of the frequency.

Type4Gap is used for RRM measurement on all FR1 frequencies or on all FR2 frequencies or on all frequencies. UE performs data activity like DL-SCH reception during Type4Gap. A Type4Gap 1E-05 consists of two interruption periods IE-09 and one measurement period 1E-07. During the interruption periods, UE performs gap operation 2. During the measurement period 1E-07, UE performs gap operation 3. A Type4Gap can be called NCSG (Network Controlled Small Gap).

Type5Gap is used for activity in the other USIM. During a Type5Gap 1E-11, UE performs gap operation4. A Type5Gap can be called MUSIM Gap.

Type6Gap is used for power management. During a Type6Gap 1E-13, UE performs gap operation6. Type6Gap starts with an UL slot. UE determines the UL slot based on the tdd-UL-DL-ConfigurationCommon.

FIG. 1F is a diagram illustrating gap patterns of various gaps.

Type1Gap and Type3Gap and Type4Gap and Type6Gap are periodically occurring once they are configured. Type2Gap is periodically occurring once configured and activated. Type5Gap is either periodically occurring or aperiodically occurring once configured.

The pattern of periodic gaps is controlled by an offset parameter and a gap repetition period parameter and a gap length parameter. For example, when offset is 24 and gap repetition period is 40 ms and gap length is 4 ms, the first gap 1F-11 occurs at subframe #4 of SFN 22 and continues 4 msec. The second gap 1F-13 occurs at subframe #4 of SFN 25 and continues 4 msec and so on.

The pattern of aperiodic gaps is controlled by offset parameter and gap repetition period parameter and gap length parameter and gap number parameter. For example, when offset is 5220 and gap repetition period is 64 ms and gap length is 32 ms, the first gap 1F-15 occurs at subframe #0 of SFN 522 and continues 32 msec. The second gap 1F-17 occurs at subframe #4 of SFN 528 and continues 32 msec. Since gap number is 2, only two gaps occur.

FIG. 1G is a diagram illustrating ASN.1 structure of IE configuring various gaps.

To configure Type1Gap or Type2Gap or Type3Gap or Type4Gap, MeasGapConfig IE is used. MeasGapConfig IE is included in MeasConfig IE. MeasConfig IE is included in RRCReconfiguration message.

MeasGapConfig IE may include a gapFR2 field and a gapFR1 field and a gapUE field and a gapBwpToRemoveList field and a gapBwpToAddModList field and a gapFRorUEToRemoveList field and a gapFRorUEToAddModList field.

gapFR2 field is included in the non-extended part of MeasGapConfig IE. gapFR1 field and gapUE IE are included in the first extended part 1G-03 of MeasGapConfig IE. gapBwpToRemoveList and gapBwpToAddModList and gapFRorUEToRemoveList and gapFRorUEToAddModList are included in the second extended part 1G-05 of MeasGapConfig IE.

gapFR1 field and gapFR2 field and gapUE field are used to configure Type1Gap or Type4Gap. gapFR1 field and gapFR2 field and gapUE field can include GapConfig IE.

gapOffset and mgl and mgrp and mgta are included in the non-extended part of GapConfig IE.

refServCellIndicator can be included in the first extended part 1G-07 of GapConfig IE.

refFR2ServCellAsyncCA and mgl2 are included in the second extended part 1G-09 of GapConfig IE.

ncsgIndicator and interruptedSlot are included in the third extended part 1G-11 of GapConfig IE.

ncsgIndicator and interruptedSlot are used to configure Type4Gap.

gapBwpToRemoveList and gapBwpToAddModList are used to configure Type2Gap.

gapFRorUEToRemoveList and gapFRorUEToAddModList are used to configure Type3Gap.

FIG. 1H is a diagram illustrating ASN.1 structure of IE configuring Type5Gap.

To configure Type5Gap, Musim-GapConfig IE is used. Musim-GapConfig IE is included in RRCReconfiguration message.

Musim-GapConfig IE can includes musim-GapConfigToRemoveList and musim-GapConfigToAddModList. musim-GapConfigToAddModList consist of plurality of musim-GapConfigToAddMod 1H-11.

To configure Type6Gap, Type6GapConfig IE is used. Type6GapConfig IE is included in RRCReconfiguration message. Type6GapConfig includes following fields: type6gapOffset, type6gapLength, type6gapRepetitionPeriod, type6GapType and type6GapRefServCellIndicator.

type6gapOffset field includes gapOffset IE. gapOffset IE indicates an integer between 0 and 159.

type6gapLength field includes gapLength IE. gapLength IE is enumerated with three values: ms0dot125, ms0dot5 and ms1. value ms0dot125 corresponds to 0.125 ms.

type6gapRepetitionPeriod field includes gapRepetitionPeriod. gapRepetitionPeriod IE is enumerated with four values: ms5, ms20, ms40 and ms160.

type6GapType field includes gapType IE. gapType IE is enumerated with three values: FR1, FR2 and UE. Alternatively, gapType IE is enumerated with a single value of FR2. If type6GapType field is present, type6Gap is FR2 gap. If type6GapType field is absent, type6Gap is UE gap. Alternatively, only one gap type is applicable to type6Gap. type6GapType field is not used in this case. The gap type could be either FR2 gap or UE gap. It is because power management for FR1 is not useful.

type6GapRefServCellIndicator indicates the reference cell for type6gap and includes ServCellIndex IE. ServCellIndex indicates a serving cell of the UE. If this field is absent, PCell is considered as the reference cell.

FIG. 2 is a diagram illustrating the operations for gap configuration.

In 2A-11, UE transmits GNB UECapability Information message. UECapability Information message includes following gap related capability information: gap-request-capability-information, gap-configuration-capability-information.

gap-request-capability-information includes following information: NeedForGap-Reporting, musim-NeedForGap-Reporting UE can request Type1Gap and Type2Gap and Type3Gap and Type4Gap by transmitting either RRCReconfigurationComplete message or RRCResumeComplete message or LocationMeasurementInfo.

UE can request Type5Gap by transmitting UEAssistanceInformation.

For UE to request gap by transmitting RRCReconfigurationComplete or RRCResumeComplete or UEAssistanceInformation, GNB needs to configure UE to request gap. GNB determines it based on reported capability. UE can request gap by LocationMeasurementInfo without any prior configuration.

NeedForGap-Reporting indicates whether the UE supports reporting the measurement gap requirement information for NR target in the UE response to a network configuration RRC message. It is enumerated with a single value of "support". It is per UE capability. A single IE can be present in UECapability for NR. Absence of the IE indicates the feature is not supported by the UE. Presence of the IE indicates the feature is supported by the UE in FR1 and in FR2 and in FDD and in TDD.

musim-NeedForGap-Reporting indicates whether the UE supports reporting the gap requirement information for MUSIM. It is enumerated with a single value of "support". It is per UE capability. A single IE can be present in UECapability for NR. Absence of the IE indicates the feature is not supported by the UE. Presence of the IE indicates the feature is supported by the UE in FR1 and in FR2 and in FDD and in TDD.

NeedForGap-Reporting indicates the capability related to type1Gap and type2Gap and type3Gap and type4Gap. If NeedForGap-Reporting and supportType2Gap are reported, UE supports reporting the measurement gap requirement information for Type2Gap. If NeedForGap-Reporting and supportType4Gapare reported, UE supports reporting the measurement gap requirement information for Type4Gap. If NeedForGap-Reporting is reported, UE supports reporting the measurement gap requirements for Type1Gap and Type3Gap.

UE does not report capability on whether the UE support reporting the measurement gap requirement information in the UE initiated RRC message (i.e., LocationMeasurementInfo).

gap-configuration-capability-information includes following information: supportedGapPattern, supportType2Gap, supportType4Gap, supportType5Gap, supportType6Gap and supportedGapCombination.

supportedGapPattern indicates measurement gap pattern (s) optionally supported by the UE. It is a bit string with 22 bits. The leading/leftmost bit (bit 0) corresponds to the gap pattern 2, the next bit corresponds to the gap pattern 3 and so on. A gap pattern is defined by a Gap Length and a Repetition Period. It is per UE capability. The supported gap patterns are supported by the UE in FR1 and in FR2 and in FDD and in TDD.

supportType2Gap indicates whether the UE supports Type2Gap (i.e., gap activated and deactivated depending on which BWP is activated; DL BWP dependent gap). It is per band capability. A plurality of IEs can be present in UECapability for NR. Absence of the IE in a band information indicates the feature is not supported by the UE in the corresponding band. Presence of the IE indicates the feature is supported by the UE in the corresponding band.

Alternatively, it can be per UE capability. In this case, a single IE can be present in UECapability for NR. Absence of the IE indicates the feature is not supported by the UE. Presence of the IE indicates the feature is supported by the UE in FR1 and in FDD and in TDD. To indicate whether UE support Type2Gap in FR2, additional capability information is used.

supportType4Gap indicates whether the UE supports Type4Gap (i.e., gap consists of interruption period and measurement period; gap where interruption on data activity occurs in the beginning of a gap and in the end of a gap; gap where measurement is performed without interruption on data activity in the middle of the gap).

It is per band capability. A plurality of IEs can be present in UECapability for NR. Absence of the IE in a band information indicates the feature is not supported by the UE in the corresponding band. Presence of the IE indicates the feature is supported by the UE in the corresponding band.

Alternatively, it can be per UE capability. In this case, a single IE can be present in UECapability for NR. Absence of the IE indicates the feature is not supported by the UE. Presence of the IE indicates the feature is supported by the UE in FR1 and in FR2 and in FDD and in TDD.

supportType5Gap indicates whether the UE supports Type5Gap.

Alternatively, it indicates whether UE supports MUSIM assistance information reporting. It is per UE capability. A single IE can be present in UECapability for NR. Absence of the IE indicates the feature is not supported by the UE. Presence of the IE indicates the feature is supported by the UE in FR1 and in FR2 and in FDD and in TDD.

supportType6Gap indicates whether the UE supports Type6Gap. It is per FR capability. two IEs can be present in UECapability for NR. Absence of the IE for FR2 indicates the feature is not supported by the UE in the FR2. Presence of the IE for FR2 indicates the feature is supported by the UE in the FR and in TDD. Presence of the IE for FR1 indicates the feature is supported by the UE in the FR and in TDD and in FDD.

supportedGapCombination indicates gap combinations supported by the UE among predefined gap combinations. It is a bit string with a predefined size. The predefined size is equal to the number of predefined gap combinations optionally supported. The leading/leftmost bit (bit 0) corresponds to the optional gap combination with the lowest index, the next bit corresponds to the optional gap combination with the next lowest index and so on. A gap combination consists of gap combination identifier (or index) and number of per-FR1 gaps and number of per-FR2 gaps and number of per-UE gaps. This IE indicates the number of measurement gaps simultaneously supported by the UE. It is per UE capability. The supported gap combinations are supported by the UE in FR1 and in FR2 and in FDD and in TDD.

A gap combination consists of gap combination identifier (or index) and number of per-FR1 gaps and number of per-FR2 gaps and number of per-UE gaps. Among the predefined gap combinations, some predefined gap combinations are mandatorily supported by the UE. Some predefined gap combinations are optionally supported by the UE. supportedGapCombination indicates which optional gap combinations are supported by the UE.

Example is shown in the table below. The range of the integer is between 0 and 2 (i.e., the highest value is 2 and the lowest value is 0; the maximum number of simultaneous gaps per FR is 2).

TABLE 4

| | # of simultaneous MG | | |
|---|---|---|---|
| Index | Per-FR1 | Per-FR2 | Per-UE |
| . . . | . . . | . . . | . . . |
| N | integer1 | integer2 | integer3 |
| n + 1 | integer4 | integer5 | integer6 |
| . . . | . . . | . . . | . . . |

Based on reported UE capabilities, GNB determines configurations to be applied to the UE. In 2A-13, GNB transmits UE first RRC message. first RRC message includes configuration information for gap request. Configuration information for gap request includes one of followings: needForGapsConfigNR, needForGapsConfigNR2, needForGapsConfigNR3 and musim-AssistanceConfig. needForGapsConfigNR and needForGapsConfigNR2 and needForGapsConfigNR3 can be included in RRCReconfiguration message or in RRCResume message. musim-AssistanceConfig can be included in otherConfig in RRCReconfiguration message. needForGapsConfigNR contains configuration related to the reporting of measurement gap requirement information. needForGapsConfigNR includes a requestedTargetBandFilterNR. The requestedTargetBandFilterNR indicates the target NR bands that the UE is requested to report the gap requirement information. The requestedTargetBandFilterNR consists of a plurality of frequency band indicators.

needForGapsConfigNR2 indicates whether UE is allowed to provide NeedForGapsInfoNR2. This IE is enumerated with a single value "True". If this IE is absent, UE is not allowed to provide NeedForGapsInfoNR2. If this IE is present, UE is allowed to provide NeedForGapsInfoNR2.

needForGapsConfigNR3 indicates whether UE is allowed to provide NeedForGapInfoNR3. This IE is enumerated with a single value "True". If this IE is absent, UE is not allowed to provide NeedForGapInfoNR3. If this IE is present, UE is allowed to provide NeedForGapInfoNR3.

If RRCReconfiguration message or RRCResume message includes needForGapInfoNR or if needForGapInfoNR has been setup and has not been released, needForGapsConfigNR2 and needForGapInfoNR3 can be included in the RRCReconfiguration message or in the RRCResume message.

musim-AssistanceConfig includes a gapRequestProhibitTimer field. the gapRequestProhibitTimer is enumerated with values. Each value corresponds to length of duration in a unit of seconds.

In 2A-15, UE checks whether gap-request is needed. UE generates gap request information if so.

UE consider itself to be configured to provide the measurement gap requirement information of NR target bands, if the RRCReconfiguration message includes the needForGapInfoNR and if needForGapInfoNR is set to setup.

UE consider itself to be configured to provide the measurement gap requirement information of NR target bands, if the RRCResume message includes the needForGapInfoNR and if needForGapInfoNR is set to setup.

condition-group-1 is fulfilled, if the RRCReconfiguration message was received via SRB1 but not within mrdc-SecondaryCellGroup or E-UTRA RRCConnectionReconfiguration or E-UTRA RRCConnectionResume, and if the UE is configured to provide the measurement gap requirement information of NR target bands, and if the RRCReconfiguration message includes the needForGapsConfigNR.

condition-group-2 is fulfilled if the RRCResume message includes the needForGapsConfigNR.

If condition-group-1 is fulfilled or condition-group-2 is fulfilled, UE include the needForGapsInfoNR in the second RRC message and set the contents as follows:

UE includes intraFreq-needForGap and set the gap requirement information of intra-frequency measurement for each NR serving cell. UE sets either gap or no-gap for each serving cell.

UE includes an entry in interFreq-needForGap and set the gap requirement information for that band if requestedTargetBandFilterNR is configured, for each supported NR band that is also included in requestedTargetBandFilterNR. UE sets either gap or no-gap for each supported NR band.

If condition-group-1 is fulfilled and the RRCReconfiguration message includes needForGapsInfoNR2, or if condition-group-2 is fulfilled and the RRCResume message includes needForGapsInfoNR2, UE includes the needForGapsInfoNR2 in the second RRC message and set the contents as follows:

The second RRC message is RRCReconfigurationComplete if condition-group-1 was fulfilled. The second message is RRCResumeComplete if condition-group-2 was fulfilled.

UE includes intraFreq-needForGap2 and set the interruption requirement information (i.e., whether ncsg is required) of intra-frequency measurement for each NR serving cell. UE sets either nesg or no-ncsg for each serving cell.

UE includes an entry in interFreq-needForGap2 and set the interruption requirement information for that band if requestedTargetBandFilterNR is configured, for each supported NR band that is also included in requestedTargetBandFilterNR. UE sets either ncsg or no-nscg for each supported NR band.

If condition-group-1 is fulfilled and if the RRCReconfiguration message includes needForGapsInfoNR3 and if only one serving cell is configured to the UE (i.e., UE is not configured with carrier aggregation; UE is configured with single carrier) as consequence of reconfiguration, UE includes the needForGapsInfoNR3 in the second RRC message and set the contents as follows:

UE includes bwpNeedForGap and set the gap requirement information for each DL BWP of PCell (or SpCell).

If condition-group-2 is fulfilled and if the RRCResume message includes needForGapsInfoNR3 and if only one serving cell is configured to the UE (i.e., UE is not configured with carrier aggregation; UE is configured with single carrier) as consequence of RRC connection resumption, UE includes the needForGapsInfoNR3 in the second RRC message and set the contents as follows:

UE includes bwpNeedForGap and set the gap requirement information for each DL BWP of PCell (or SpCell).

UE consider itself to be configured to provide MUSIM assistance information, if the received otherConfig includes musim-AssistanceConfig and if musim-AssistanceConfig is set to setup.

If UE is configured to provide MUSIM assistance information and if UE needs the Type5Gap, UE initiate transmission of UEAssistanceInformation as follows:

If UE has a preference for Type5Gap, UE includes musim-GapRequestList in the UEAssistanceInformation.

If UE determines that type6Gap request is needed, UE generates a type6 request MAC CE. The type6 request MAC CE can includes an information on ratio between the length of type6Gap and the repetition period of type6Gap. If transmission power sum should be decreased a lot, higher ratio is reported.

NeedForGapsInfoNR consists of intraFreq-needForGap and interFreq-needForGap. NeedForGapsInfoNR is used to indicate the measurement gap requirement information of the UE for NR target bands.

intraFreq-needForGap field includes NeedForGapsIntraFreqlist IE. This field indicates the measurement gap requirement information for NR intra-frequency measurement.

NeedForGaps IntraFreqlist consists of a plurality of NeedForGapsIntraFreq. NeedForGapsIntraFreq consists of servCellId and gapIndicationIntra. servCellId indicates the serving cell which contains the target SSB (associated with the initial DL BWP) to be measured. gapIndicationIntra indicates whether measurement gap is required for the UE to perform intra-frequency SSB based measurements on the concerned serving cell. "gap" indicates that a measurement gap is needed if any of the UE configured BWPs do not contain the frequency domain resources of the SSB associated to the initial DL BWP. "no-gap" indicates a measurement gap is not needed to measure the SSB associated to the initial DL BWP for all configured BWPs.

interFreq-needForGap field includes NeedForGapsBandlistNR. This field indicates the measurement gap requirement information for NR inter-frequency measurement.

NeedForGapsBandlistNR consists of a plurality of NeedForGapsNR. NeedForGapsNR consists of bandNR and gapIndication. bandNR indicates the NR target band to be measured. gapIndication indicates whether measurement gap is required for the UE to perform SSB based measurements on the concerned NR target band while NR-DC or NE-DC is not configured. The UE determines this information based on the resultant configuration of the RRCReconfiguration or RRCResume message that triggers this response. Value gap indicates that a measurement gap is needed, value no-gap indicates a measurement gap is not needed.

NeedForGapsInfoNR2 consists of intraFreq-needForGap2 and interFreq-needForGap2. NeedForGapsInfoNR2 is used to indicate the interruption requirement information of the UE for NR target bands. Alternatively, this IE is used to indicate type4Gap (i.e., network controlled small gap) requirement information of the UE for NR target bands.

intraFreq-needForGap2 field includes NeedForGapslist2 IE. This field indicates the interruption requirement (or type4Gap requirement) information for NR intra-frequency measurement.

interFreq-needForGap2 field includes NeedForGapslist2 IE. This field indicates the interruption requirement (or type4Gap requirement) information for NR inter-frequency measurement.

intraFreq-needForGap2 field includes NeedForGapslist2. interFreq-needForGap2 field includes NeedForGapslist2. NeedForGapslist2 IE includes a plurality of NeedForGaps2 IEs.

The first entry (i.e., the first NeedForGap2) of NeedForGaplist2 IE in intraFreq-needForGap2 field corresponds to the first entry (i.e., the first NeedForGapsIntraFreq) of NeedForGapsIntraFreqlist IE in intraFreq-needForGap field. The second entry (i.e., the second NeedForGap2) of NeedForGaplist2 IE in intraFreq-needForGap2 field corresponds to the second entry (i.e., the second NeedForGapsIntraFreq) of NeedForGapsIntraFreqlist IE in intraFreq-needForGap field and so on.

The first entry (i.e., the first NeedForGap2) of NeedForGaplist2 IE in interFreq-needForGap2 field corresponds to the first entry (i.e., the first NeedForGapsNR) of NeedForGapsBandlistNR IE in interFreq-needForGap field. The second entry (i.e., the second NeedForGap2) of NeedForGaplist2 IE in interFreq-needForGap2 field corresponds to the second entry (i.e., the second NeedForGapsNR) of NeedForGapsBandlistNR IE in interFreq-needForGap field. and so on.

NeedForGaps2 is enumerated with two values: "ncsg" and "no-ncsg".

If NeedForGaps2 is set to "ncsg" for an entry in intraFreq-needForGap2, ncsg (or type4Gap) is required for the UE to perform intra-frequency SSB measurement or intra-frequency CSI-RS measurement on the concerned serving cell.

If NeedForGaps2 is set to "ncsg" for an entry in interFreq-needForGap2, ncsg (or type4Gap) is required for the UE to perform inter-frequency SSB measurement or inter-frequency CSI-RS measurement on the concerned NR target band.

If NeedForGaps2 is set to "no-ncsg" for an entry in intraFreq-needForGap2, ncsg (or type4Gap) is not required for the UE to perform intra-frequency SSB measurement or intra-frequency CSI-RS measurement on the concerned serving cell.

If NeedForGaps2 is set to "no-ncsg" for an entry in interFreq-needForGap2, ncsg (or type4Gap) is not required for the UE to perform inter-frequency SSB measurement or inter-frequency CSI-RS measurement on the concerned NR target band.

If gapIndicationIntra for a serving cell is set to "gap", and if NeedForGap2 for the serving cell is set to "ncsg", nesg is required for the UE to perform intra-frequency SSB measurement or intra-frequency CSI-RS measurement on the concerned serving cell.

If gapIndicationIntra for a serving cell is set to "no-gap", and if NeedForGap2 for the serving cell is set to "nesg", nesg is required for the UE to perform intra-frequency SSB measurement or intra-frequency CSI-RS measurement on the concerned serving cell.

If gapIndicationIntra for a serving cell is set to "gap", and if NeedForGap2 for the serving cell is set to "no-ncsg", measurement gap is required for the UE to perform intra-frequency SSB measurement or intra-frequency CSI-RS measurement on the concerned serving cell.

If gapIndicationIntra for a serving cell is set to "no-gap", and if NeedForGap2 for the serving cell is set to "no-ncsg", neither ncsg nor measurement gap is required for the UE to perform intra-frequency SSB measurement or intra-frequency CSI-RS measurement on the concerned serving cell.

If gapIndication for a NR band is set to "gap", and if NeedForGap2 for the NR band is set to "ncsg", nesg is required for the UE to perform inter-frequency SSB measurement or inter-frequency CSI-RS measurement on the concerned NR band.

If gapIndication for a NR band is set to "no-gap", and if NeedForGap2 for the NR band is set to "ncsg", nesg is required for the UE to perform inter-frequency SSB measurement or inter-frequency CSI-RS measurement on the concerned NR band.

If gapIndication for a NR band is set to "gap", and if NeedForGap2 for the NR band is set to "no-ncsg", measurement gap is required for the UE to perform inter-frequency SSB measurement or inter-frequency CSI-RS measurement on the concerned NR band.

If gapIndication for a NR band is set to "no-gap", and if NeedForGap2 for the NR band is set to "no-ncsg", neither ncsg nor measurement gap is required for the UE to perform inter-frequency SSB measurement or inter-frequency CSI-RS measurement on the concerned NR band.

Alternatively, NeedForGap2s are included only for entries of which gapIndicationIntra/gapIndication is set to "gap".

Alternatively, NeedForGap2s are included only for entries of which gapIndicationIntra/gapIndication is set to "no-gap".

Alternatively, NeedForGaps2 is enumerated with three values: "no-gap-no-ncsg" and "ncsg" and "gap".

intraFreq-needForGap2 field includes intraNeedForGapslist2. interFreq-needForGap2 field includes interNeedForGapslist2. intraNeedForGapslist2 IE includes a plurality of intraNeedForGaps2 IEs. interNeedForGapslist2 IE includes a plurality of interNeedForGaps2 IEs.

IntraNeedForGaps2 IE consists of ServCellIndex and NeedForGaps2. InterNeedForGaps2 IE consists of frequency band indicator and NeedForGaps2.

If NeedForGaps2 for a serving cell is set to "gap", type1Gap or type3Gap is required for the UE to perform intra-frequency SSB measurement or intra-frequency CSI-RS measurement on the concerned serving cell.

If NeedForGaps2 for a serving cell is set to "ncsg", type4Gap is required for the UE to perform intra-frequency SSB measurement or intra-frequency CSI-RS measurement on the concerned serving cell.

If NeedForGaps2 for a serving cell is set to "no-gap-no-ncsg", neither type1 nor type3 nor type4Gap is required for the UE to perform intra-frequency SSB measurement or intra-frequency CSI-RS measurement on the concerned serving cell.

If NeedForGaps2 for a NR band is set to "gap", type1Gap or type3Gap is required for the UE to perform inter-frequency SSB measurement or inter-frequency CSI-RS measurement on the concerned NR band.

If NeedForGaps2 for a NR band is set to "ncsg", type4Gap is required for the UE to perform inter-frequency SSB measurement or inter-frequency CSI-RS measurement on the concerned NR band.

If NeedForGaps2 for a NR band is set to "no-gap-no-ncsg", neither type1 nor type3 nor type4Gap is required for the UE to perform inter-frequency SSB measurement or inter-frequency CSI-RS measurement on the concerned NR band.

NeedForGapsInfoNR3 consists of a bwpNeedForGap. NeedForGapsInfoNR3 is used to indicate the measurement gap requirement information of DL BWPs configured for the UE.

bwpNeedForGap field includes a BIT STRING. The size of the BIT STRING is equal to the number of DL BWPs configured for the UE in the PCell. Alternatively, the size of the BIT STRING is fixed to a specific value such as 4.

The leading/leftmost bit (bit 0) corresponds to the DL BWP with lowest index (or BWP 0). The next bit corresponds to the DL BWP with next lowest index (or BWP 1) and so on. Value 1 indicates type2Gap is required for the UE to perform measurement in the corresponding DL BWP. Value 0 indicates type2Gap is not required for the UE to perform measurement in the corresponding DL BWP. The measurement can be intra-frequency measurement based on SSB or intra-frequency measurement based on CSI-RS.

musim-GapRequestList consists of MUSIM-GapRequestList IE. This IE indicate the MUSIM gap (i.e., type5Gap) requirement information.

MUSIM-GapRequestList IE includes one or two or three MUSIM-GapRequestInfo IE. The reason to limit to three in maximum is because configuring a single aperiodic gap and two periodic gaps is a common scenario with consideration of MUSIM gap usage.

MUSIM-GapRequestInfo includes RequestedMusim-GapType and RequestedMusim-GapOffset and RequestedMusim-GapLength and RequestedMusim-GapRepetitionPeriod and RequestedMusim-GapNumber.

RequestedMusim-GapType is enumerated with a single value of "aperiodic". If this IE is present in MUSIM-GapRequestInfo and this IE indicates "aperiodic", aperiodic musim-gap is required. If this IE is absent in MUSIM-GapRequestInfo, periodic musim-gap is required.

Alternatively, RequestedMusim-GapType is enumerated with a single value of "periodic". If this IE is present in MUSIM-GapRequestInfo and this IE indicates "periodic", periodic musim-gap is required. If this IE is absent in MUSIM-GapRequestInfo, aperiodic musim-gap is required.

Alternatively, if RequestedMusim-GapRepetitionPeriod is present in MUSIM-GapRequestInfo, periodic musim-gap is required. If this IE is absent in MUSIM-GapRequestInfo, aperiodic musim-gap is required.

Alternatively, if RequestedMusim-GapRepetitionPeriod in MUSIM-GapRequestInfo is set to a specific value like 0, aperiodic musim-gap is required. If RequestedMusim-GapRepetitionPeriod in MUSIM-GapRequestInfo is set to other value, periodic musim-gap is required.

Alternatively, if RequestedMusim-GapNumber is present in MUSIM-GapRequestInfo, aperiodic musim-gap is required. If this IE is absent in MUSIM-GapRequestInfo, periodic musim-gap is required.

RequestedMusim-GapOffset1 and RequestedMusim-GapOffset2 indicate the preferred musim-Gap starting time point.

RequestedMusim GapLength1 and RequestedMusim-GapLength2 indicate the preferred musim-Gap length.

RequestedMusim-GapRepetitionPeriod1 and RequestedMusim-GapRepetitionPeriod2 indicate the preferred repetition period.

RequestedMusim-GapNumber indicates the preferred number of aperiodic musim-Gap.

If the requested gap is periodic gap, RequestedMusim-GapOffset1 and RequestedMusim-GapLength1 and RequestedMusim-GapRepetitionPeriod1 are included.

If the requested gap is aperiodic gap, RequestedMusim-GapOffset2 and RequestedMusim-GapLength2 and RequestedMusim-GapRepetitionPeriod2 and RequestedMusim-GapNumber are included.

RequestedMusim-GapOffset1 is an integer between 0 and 159. RequestedMusim-GapOffset2 is an integer between 0 and 10239.

RequestedMusim-GapLength1 is enumerated with eight values: ms1dot5, ms3, ms3dot5, ms4, ms5dot5, ms6, ms10, ms20.

RequestedMusim-GapLength2 is enumerated with four values: ms32, ms64, ms128, ms256.

RequestedMusim-GapRepetitionPeriod1 is enumerated with four values: ms20, ms40, ms80, ms160.

RequestedMusim-GapRepetitionPeriod2 is enumerated with four values: ms64, ms128, ms256, ms512.

RequestedMusim-GapRepetitionPeriod1 is enumerated with four values: one, two, four, eight.

In 2A-17, UE transmits GNB second RRC message or first MAC CE to request a gap configuration.

If the first RRC message was RRCResume message, the second RRC message is RRCResumeComplete message. The RRCResumeComplete message can include either NeedForGapsInfoNR or NeedForGapsInfoNR and NeedForGapsInfoNR2 or NeedForGapsInfoNR and NeedForGapsInfoNR3.

If the first RRC message was RRCReconfiguration message, and if UE consider itself to be configured to provide the measurement gap requirement information, the second RRC message is RRCReconfigurationComplete message. The RRCReconfigurationComplete message can include either NeedForGapsInfoNR or NeedForGapsInfoNR and NeedForGapsInfoNR2 or NeedForGapsInfoNR and NeedForGapsInfoNR3.

If the first RRC message was RRCReconfiguration message, and if UE consider itself to be configured to provide MUSIM assistance information, the second RRC message is UEAssistanceInformation message.

If UE determines to request Type6Gap, the first MAC CE is type6 request MAC CE.

The RRCReconfigurationComplete message includes same transaction-identifier as the transaction-identifier included in RRCReconfiguration message.

The RRCResumeComplete message includes same transaction-identifier as the transaction-identifier included in RRCResume message.

UEAssistanceInformation message does not include transaction-identifier.

RRCReconfigurationComplete message is included in a MAC SDU. The MAC SDU is included in a first part of a MAC PDU. The MAC PDU is transmitted to the GNB.

RRCResumeComplete message is included in a MAC SDU. The MAC SDU is included in a first part of a MAC PDU. The MAC PDU is transmitted to the GNB.

type6 request MAC CE is included in a second part of a MAC PDU. The MAC PDU is transmitted to the GNB.

A MAC SDU contains the packet generated by upper layers. A MAC CE like type6 request MAC CE is generated by MAC itself. MAC SDUs are located in the first part and MAC CEs are located in the second part. The first part is followed by the second part. The first part is located before the second part. The second part is located after the first part. The reason is because MAC CEs are usually generated immediately before MAC PDU is built up.

GNB receives the second message and determines gap configurations for the UE.

In 2A-19, GNB transmits UE third RRC message to indicate gap configuration.

The third message can be RRCReconfiguration message.

To configure Type1Gap or Type2Gap or Type3Gap or Type4Gap, GNB includes MeasConfig IE in the RRCReconfiguration message. The MeasConfig IE specifies measurements to be performed by the UE. The MeasConfig IE includes measGapConfig IE.

MeasGapConfig IE may include a gapFR2 field and a gapFR1 field and a gapUE field and a gapBwpToRemoveList field and a gapBwpToAddModList field and a gapFRorUEToRemoveList field and a gapFRorUEToAddModList field.

gapFR2 and gapFR1 and gapUE are defined as SetupRelease. If gapFR2 (or gapFR1 or gapUE) is set to "setup", a gapConfig IE is included in the gapFR2 (or gapFR1 or gapUE) and a FR2-gap (or FR1-gap or UE-gap) is setup. If gapFR2 (or gapFR1 or gapUE) is set to "release", corresponding gapConfig is released.

gapBwpToRemoveList consists of a plurality of gapBwpId. gapBwpToAddModList consists of a plurality of gapBwpToAddMod IEs. A gap corresponding to the gapBwpId is released if the gapBwpId is included in the gapBwpToRemoveList. A UE Type2Gap is setup according to a gapBwpToAddMod if the gapBwpToAddMod is included in gapBwpToAddModList.

gapFRorUEToRemoveList consists of a plurality of gapFRorUEId. gapFRorUEToAddModList consists of a plurality of gapFRorUEToAddMod IEs. A gap corresponding to the gapId is released if the gapId is included in the gapFRorUEToRemoveList. A FR2-gap (or FR1-gap or UE-gap) is setup according to a gapFRorUEToAddMod if the gapFRorUEToAddMod is included in gapFRorUEToAddModList.

A gapFR1 field indicates measurement gap configuration that applies to FR1 only. A gapFR2 field indicates measurement gap configuration that applies to FR2 only. A gapUE field indicates measurement gap configuration that applies to all frequencies (FR1 and FR2). A gapFRorUE field indicates measurement gap configuration that applies to FR1 only or FR2 only or to all frequencies (FR1 and FR2) according to a gapType parameter included in the gapFRorUEToAddMod IE.

gapFR1 and gapUE can be included in the first extended part of MeasGapConfig. a gapBwpToRemoveList IE and a gapBwpToAddModList IE and gapFRorUEToRemoveList and gapFRorUEToAddModList can be included in the second extended part of MeasGapConfig. The second extended part is placed after the first extended part in the MeasGapConfig IE.

A gapConfig IE indicates the time pattern of the gap and the type of the gap. A gapConfig IE includes gapOffset and mgl and mgrp and mgta and mgl2 and ncsgIndicator and interruptedSlot and mgrp2.

mgl2 is included in the second extended part of gapConfig IE. ncsgIndicator and interruptedSlot and mgrp2 are included in the third extended part of gapConfig IE. The third extended part is placed after the second extended part in the gapConfig IE.

gapOffset indicates an integer between 0 and 159 (i.e., highest mgrp-1).

gapOffset2 indicates an integer between 160 (i.e., highest mgrp) and 1279 (i.e., highest mgrp2-1).

gapOffset is mandatorily present and gapOffset2 is optionally present. mgrp is mandatorily present and mgrp2 is optionally present. If mgrp and mgrp2 and gapOffset and gapOffset2 are present, UE uses mgrp2 and gapOffset2 to setup the gap. If mgrp and mgrp2 and gapOffset are present, UE uses mgrp2 and gapOffset to setup the gap. If mgrp and gapOffset are present, UE uses mgrp and gapOffset to setup the gap.

mgl is enumerated with six values: ms1dot5 and ms3 and ms3dot5 and ms4 and ms5dot5 and ms6. value ms1dot5 corresponds to 1.5 ms. value 3 ms corresponds to 3 ms and so on. mgl is used to configure a Type1Gap.

mgl2 is enumerated with two values: ms10 and ms20. mgl and mgl2 indicate the length of gap. If both mgl and mgl2 are included in a gapConfig, mgl2 is applied and mgl is ignored.

mgrp is enumerated with four values: ms20, ms40, ms80 and ms160. mgrp2 is enumerated with two values: ms640 and ms1280. mgrp and mgrp2 indicate the periodicity of the gap. If both mgrp and mgrp2 are included in a gapConfig, mgrp2 is applied and mgrp is ignored.

mgta IE is enumerated with three values: ms0, ms0dot25 and ms0dot5. mgta IE indicates the measurement gap timing advance (or interruption timing advance in case of Type4Gap) in ms.

ncsgIndicator is enumerated with a single value of "True". If this IE is present in the GapConfig, GapConfig is the configuration of type4Gap. If this IE is absent in the GapConfig, GacpConfig is the configuration of Type1Gap.

interruptedSlot is enumerated with two values: sl1 and sl2. value sl1 corresponds to one slot and value sl2 corresponds to two slots. This IE is present only if the configuration is for Type4Gap. This IE indicates the number of interrupted slots in the beginning of a Type4Gap and in the end of the Type4Gap.

A gapBwpToAddMod IE indicates the time pattern of Type2Gap. A gapBwpToAddMod IE includes a gapBwpId and a gapOffset and a mgl3 and a mgrp and a mgta and an AssociatedBWP and a gapPurpose.

The gapBwpId is an integer between 0 and 2.

A mgl3 is enumerated with eight values: ms1dot5 and ms3 and ms3dot5 and ms4 and ms5dot5 and ms6 and ms10 and ms20. mgl3 indicates the length of the gap configured by the gapBwpToAddMod. mgl3 covers both mgl1 and mgl2.

gapPurpose is enumerated with three values: ssb, csi-rs and prs. If gapPurpose is set to "ssb", Type2Gap is for SSB measurement. If gapPurpose IE is set to "csi-rs", Type2Gap is for CSI-RS measurement. If gapPurpose is set to "prs", Type2Gap is for PRS measurement.

AssociatedBWP is a bitmap. The length of the bitmap is equal to the number of DL BWPs configured for the UE in the PCell (or equal to 4). The first/leftmost bit corresponds to the DL BWP with lowest BWP-Id (or BWP-Id 0), the second bit corresponds to the DL BWP with second lowest BWP-Id (or BWP-Id 1) and so on. Value 0 in the bitmap indicates that the Type2Gap is activated (or the Type2Gap is currently active) in case that the corresponding DL BWP is activated (or the corresponding DL BWP is currently active). Alternatively, Value 0 in the bitmap indicates that the Type2Gap is deactivated (or the Type2Gap is currently inactive) in case that the corresponding DL BWP is activated (or the corresponding DL BWP is currently active).

Alternatively, Type2Gap status information can be included in a BWP configuration information.

A gapFRorUEToAddMod IE indicates the time pattern of gapFRorUE. A gapFRorUEToAddMod IE includes a gap-Id and a gapType and a gapOffset and a mgl3 and a mgrp and a mgta.

A gap-Id IE is an integer between 0 and 3.

A gapType IE is enumerated with three values: gapFR2, gapFR1 and gapUE. If gapType IE indicates "gapFR2" (or "gapFR1" or "gapUE"), the corresponding gap is a FR2-gap (or FR1-gap or UE-gap).

A mgl3 IE is enumerated with eight values: ms1dot5 and ms3 and ms3dot5 and ms4 and ms5dot5 and ms6 and ms10 and ms20. mgl3 indicates the length of the gap configured by the GapFRorUEToAddMod.

To configure Type5Gap, GNB includes musim-GapConfig IE in the RRCReconfiguration message. musim-GapConfig IE indicates the gap configuration of Type5Gap that applies to all frequencies. a musim-GapConfig IE includes a single musim-GapToReleaseList IE and a single musim-GapToAddModList IE. A musim-GapToReleaseList consists of a plurality of musim-GapId. A musim-GapToAddModList consists of a plurality of musim-GapToAddMod IEs.

A musim-GapToAddMod IE can include musim-gapId, musim-gaptype, gapOffset, mgl3, mgrp, mgta, gapOffset3, mgl4, mgrp2 and mgn.

A musim-gapId IE is an integer between 0 and 2.

musim-gapType is enumerated with two values: "periodic" and "aperiodic". If this IE indicates "periodic", musim-gap is periodic gap. If this IE indicates "aperiodic", musim-gap is aperiodic gap.

Alternatively, musim-gapType is enumerated with single value of "periodic". If this IE is present, musim-gap is periodic gap. If this IE is absent, musim-gap is aperiodic gap.

Alternatively, musim-gapType is enumerated with single value of "aperiodic". If this IE is present, musim-gap is aperiodic gap. If this IE is absent, musim-gap is periodic gap.

If musim-gap is periodic gap, gapOffset and mgl3 and mgrp and mgta are present.

If musim-gap is aperiodic gap, gapOffset3 and mgl4 and mgrp2 and mgta and mgn are present.

gapOffset3 indicates an integer between 0 and 10239 (i.e., the highest SFN*10−1). The maximum value of gapOffset3 is bounded by highest SFN instead of being bounded by highest mgrp2. It allows the musim aperiodic gap to start in any radio frame.

A mgl4 is enumerated with four values: ms32 and ms64 and ms128 and ms256. The minimum value of mgl4 is greater than the minimum value of mgl3. The maximum value of mgl4 is greater than the maximum value of mgl3. It is because the length of aperiodic gap needs to be longer than that of periodic gap considering the purpose of gaps.

A mgn is enumerated with four values: one, two, four and eight. The mgn indicates the number of occurrences of the gap.

A mgrp2 is enumerated with four values: sf64, sf128, sf256 and sf512. value sf64 corresponds to 64 subframes; value sf128 corresponds to subframe 128 and so on. The mgrp2 indicates the distance between adjacent gaps. Alternatively, the mgrp2 indicates the periodicity of the gap.

To configure Type6Gap, GNB includes Type6GapConfig IE in the RRCReconfiguration message.

In 2A-21, UE setup the gap based on the gap information received in 2A-17.

If the third message includes measGapConfig IE, UE determines the gap to be setup according to the information included in the measGapConfig IE as shown in the table below.

TABLE 5

| Conditions for Type1Gap determination | when the conditions are fulfilled, UE setup following gap |
|---|---|
| If measGapConfig includes gapFR1 and if gapFR1 is set to setup and if the GapConfig does not include the third extended part (which includes ncsgIndicator etc) | UE setup FR1 type1Gap |
| If measGapConfig includes gapFR1 and if gapFR1 is set to release and if the established gapFR1 is FR1 type1Gap | UE release FR1 type1Gap |
| If measGapConfig includes gapFR2 and if gapFR2 is set to setup and if the GapConfig does not include the third extended part (which includes ncsgIndicator etc) | UE setup FR2 type1Gap |
| If measGapConfig includes gapFR2 and if gapFR2 is set to release and if the established gapFR2 is FR2 type1Gap | UE release FR2 type1Gap |

TABLE 5-continued

| Conditions for Type1Gap determination | when the conditions are fulfilled, UE setup following gap |
|---|---|
| If measGapConfig includes gapUE and if gapUE is set to setup and if the GapConfig does not include the third extended part (which includes ncsgIndicator etc) | UE setup UE type1Gap |
| If measGapConfig includes gapUE and if gapFR2 is set to release and if the established gapUE is UE type1Gap | UE release UE type1Gap |

TABLE 6

| Conditions for Type2Gap determination | when the conditions are fulfilled |
|---|---|
| If measGapConfig includes gapBwpToAddModList and if gapType is set to FR1 in at least one entry (or gapBwpToAddMod) | UE setup FR1 type2Gap for the corresponding gap-Id |
| If measGapConfig includes gapBwpToReleaseList and if at least one gap-Id in the list is associated with FR1 type2Gap | UE release FR1 type2Gap corresponding to the gap-Id |
| If measGapConfig includes gapBwpToAddModList and if gapType is set to FR2 in at least one entry (or gapBwpToAddMod) | UE setup FR2 type2Gap for the corresponding gap-Id |
| If measGapConfig includes gapBwpToReleaseList and if at least one gap-Id in the list is associated with FR2 type2Gap | UE release FR2 type2Gap corresponding to the gap-Id |
| If measGapConfig includes gapBwpToAddModList and if gapType is set to UE in at least one entry (or gapBwpToAddMod) | UE setup UE type2Gap for the corresponding gap-Id |
| If measGapConfig includes gapBwpToReleaseList and if at least one gap-Id in the list is associated with UE type2Gap | UE release UE type2Gap corresponding to the gap-Id |

TABLE 7

| Conditions for Type3Gap determination | when the conditions are fulfilled |
|---|---|
| If measGapConfig includes gapFRorUEToAddModList and if gapType is set to FR1 in at least one entry (or gapFRorUEToAddMod) | UE setup FR1 type3Gap for the corresponding gap-Id |
| If measGapConfig includes gapFRorUEToReleaseList and if at least one gap-Id in the list is associated with FR1 type3Gap | UE release FR1 type3Gap corresponding to the gap-Id |
| If measGapConfig includes gapFRorUEToAddModList and if gapType is set to FR2 in at least one entry (or gapFRorUEToAddMod) | UE setup FR2 type3Gap for the corresponding gap-Id |
| If measGapConfig includes gapFRorUEToReleaseList and if at least one gap-Id in the list is associated with FR2 type3Gap | UE release FR2 type3Gap corresponding to the gap-Id |
| If measGapConfig includes gapFRorUEToAddModList and if gapType is set to UE in at least one entry (or gapFRorUEToAddMod) | UE setup UE type3Gap for the corresponding gap-Id |
| If measGapConfig includes gapFRorUEToReleaseList and if at least one gap-Id in the list is associated with UE type3Gap | UE release UE type3Gap corresponding to the gap-Id |

TABLE 8

| Conditions for Type4Gap determination | when the conditions are fulfilled |
|---|---|
| If measGapConfig includes gapFR1 and if gapFR1 is set to setup and if at least one IE related to type4Gap is included in the third extended part of the measGapConfig | UE setup FR1 type4Gap |
| If measGapConfig includes gapFR1 and if gapFR1 is set to release and if the established FR1 gap is FR1 type4Gap | UE release FR1 type4Gap |
| If measGapConfig includes gapFR2 and if gapFR2 is set to setup and at least one IE related to type4Gap is included in the third extended part of the measGapConfig | UE setup FR2 type4Gap |
| If measGapConfig includes gapFR2 and if gapFR2 is set to release and if the established FR2 gap is FR2 type4Gap | UE release FR2 type4Gap |

TABLE 8-continued

| Conditions for Type4Gap determination | when the conditions are fulfilled |
|---|---|
| If measGapConfig includes gapUE and if gapFR2 is set to setup and at least one IE related to type4Gap is included in the third extended part of the measGapConfig | UE setup UE type4Gap |
| If measGapConfig includes gapFR1 and if gapFR1 is set to release and if the established FR1 gap is FR1 type4Gap | UE release UE type4Gap |

TABLE 9

| Conditions for Type5Gap determination | when the conditions are fulfilled |
|---|---|
| If musim-GapConfig includes musim-GapToAddModList and if at least one musim-GapConfigToAddMod's musim-gapType is set to "periodic" | UE setup periodic UE type5Gap for the corresponding musim-gapId. |
| If musim-GapConfig includes musim-GapToAddModList and if at least one musim-GapConfigToAddMod's musim-gapType is set to "aperiodic" | UE setup aperiodic UE type5Gap for the corresponding musim-gapId. |
| If musim-GapConfig includes musim-GapToReleaseList and if at least one musim-gapId is included in the list | UE release UE type5Gap corresponding to musim-gapId. |

TABLE 10

| Conditions for Type6Gap determination | when the conditions are fulfilled |
|---|---|
| If type6GapConfig is included in RRCReconfiguration and if type6GapType is set to FR1 | UE setup FR1 type6Gap |
| If type6GapConfig is included in RRCReconfiguration and if type6GapType is set to FR2 | UE setup FR2 type6Gap |
| If type6GapConfig is included in RRCReconfiguration and if type6GapType is set to UE | UE setup UE type6Gap |

FR1 type1Gap and FR2 type1Gap and UE type1Gap and UE type2Gap and FR1 type3Gap and FR2 type3Gap and UE type3Gap and FR1 type4Gap and FR2 type4Gap and UE type4Gap are established as below.

UE setup the gap configuration indicated by the measGapConfig in accordance with OFFSET, i.e., the first subframe of each gap occurs at an SFN and subframe meeting the following condition:

$$SFN \bmod T = \text{FLOOR}(\text{OFFSET}/10);$$

$$\text{subframe} = \text{OFFSET} \bmod 10;$$

$$\text{with } T = \text{MGRP}/10;$$

OFFSET is determined from gapOffset and gapOffset2.

MGRP is determined from mgrp and mgrp2.

UE apply the specified timing advance mgta to the gap occurrences calculated above (i.e., the UE starts the measurement mgta ms before the gap subframe occurrences).

Periodic Type5Gap is established as below.

UE setup the gap configuration indicated by the musim-GapConfig in accordance with the received gapOffset, i.e., the first subframe of each gap occurs at an SFN and subframe meeting the following condition:

$$SFN \bmod T = \text{FLOOR}(\text{gapOffset}/10);$$

$$\text{subframe} = \text{gapOffset} \bmod 10;$$

$$\text{with } T = \text{MGRP}/10;$$

UE apply the specified timing advance mgta to the gap occurrences calculated above (i.e. the UE starts the measurement mgta ms before the gap subframe occurrences).

Aperiodic Type5Gap is established as below.

UE setup the gap configuration indicated by the musim-GapConfig in accordance with OFFSET2, i.e., the first subframe of each gap occurs at an SFN and subframe meeting the following condition:

$$SFN = \text{FLOOR}(\text{OFFSET2}/10);$$

$$\text{subframe} = \text{OFFSET2} \bmod 10;$$

UE apply the specified timing advance mgta to the gap occurrences calculated above (i.e. the UE starts the measurement mgta ms before the gap subframe occurrences).

OFFSET2 is determined from gapOffset and gapOffset3. OFFSET2 is gapOffset3 if both gapOffset and gapOffset3 are present in the musim-GapConfig. OFFSET2 is gapOffset if only gapOffset is present in the musim-GapConfig.

Aperiodic Type5Gap occurs mgn times.

Type6Gap is established as below.

UE setup the gap configuration indicated by the type6GapConfig in accordance with the received gapOffset, i.e., the reference subframe of each gap occurs at an SFN and subframe meeting the following condition:

$$SFN \bmod T = \text{FLOOR}(\text{gapOffset}/10);$$

subframe=gapOffset mod 10 if gapRepetitionPeriod is larger than 5 ms;

subframe=gapOffset or gapOffset+5 if gapRepetitionPeriod is equal to 5 ms;

$$\text{with } T = \text{CEIL}(\text{gapRepetitionPeriod}/10);$$

As a consequence of above operations, UE setup multiple gap configurations. To achieve reasonable level of UE implementation complexity, the possible combinations of gaps are limited as below.

TABLE 11

| | Simultaneous configuration & use (activation) |
|---|---|
| Case 1 | n1 * FR1-Type1Gap + n2 * FR2-Type1Gap can be configured and used simultaneously<br>n1 and n2 are either 0 or 1. |
| Case 2 | n3 * UE-Type1Gap can be configured and used<br>n3 is 1. |
| Case 3 | n1 * FR1-Type4Gap + n2 * FR2-Type4Gap can be configured and used simultaneously |
| Case 4 | n3 * UE-Type4Gap can be configured and used simultaneously |
| Case 5 | n4 * FR1-Type3Gap + n5 * FR2-Type3Gap + n6 * UE-Type3Gap can be configured and used simultaneously.<br>n4 and n5 and n6 are either 0 or 1 or 2.<br>All n4 and n5 and n6 being 0 is not valid |
| Case 6 | n7 * Type2Gap can be configured simultaneously<br>n7 is either 1 or 2 or 3<br>Only one Type4Gap among the configured Type4Gap is used |
| Case 7 | n8* Type5Gap can be configured and used simultaneously<br>n8 is 1 or 2 or 3 |

All the Type1Gap and Type3Gap and Type4Gap and Type5Gap are immediately used (i.e., used from the next occurrence) once the corresponding gap configurations are setup. A plurality of Type2Gap configuration can be setup. However only one of plurality of Type2Gap is used depending on the currently active downlink BWP.

Only one Type1Gap or only one Type4Gap can be configured and used as FR1-gap. one or two Type3Gap can be configured and used simultaneously as FR1-gap.

Only one Type1Gap or only one Type4Gap can be configured as FR2-gap. one or two Type3Gap can be configured and used simultaneously as FR2-gap.

Only one Type1Gap or only one Type4Gap can be configured and used simultaneously as UE-gap. A plurality of Type2Gap can be configured as UE-gap. A plurality of Type5Gap can be configured as UE-gap. Only one Type2Gap can be used as UE-gap. A plurality of Type5Gap can be used as UE-gap simultaneously.

A certain IE (or field) being enumerated with x and y means that the IE (or field) can indicate one of x and y.

In 2A-23, UE applies gap operations during a gap. UE performs normal operations during non-gap.

TABLE 12

| Gap type | Applied gap operation |
|---|---|
| Type1Gap | Gap Operation 1 during the gap |
| Type2Gap | Gap Operation 1-1 during the gap |
| Type3Gap | Gap Operation 1-1 during the gap |
| Type4Gap | Gap Operation 2 during interruption length<br>Gap operation 3 during measurement length |
| Type5Gap | Gap Operation 4 during the gap |
| Type6Gap | Gap Operation 6 during the gap |

A gap being active means the relevant gap operation being applied. A gap being inactive means the relevant gap operation not being applied and normal operation being applied as if gap is not configured. Gap operation comprises data-activity-action-group and non-data-activity-action-group.

TABLE 13

| Gap operation type | data-activity-action-group | non-data-activity-action-group |
|---|---|---|
| Gap operation 1 | For serving-carrier-group,<br>not performing the transmission of HARQ feedback, SR, and CSI in the uplink slots and in the uplink symbols of flexible slots during the gap.<br>not reporting SRS in the uplink slots and in the uplink symbols of flexible slots during the gap.<br>not transmitting on UL-SCH except for Msg3 or the MSGA payload in the uplink slots and in the uplink symbols of flexible slots during the gap.<br>not monitoring the PDCCH in the downlink slots and in the downlink symbols of flexible slots during the gap except period X.<br>not receiving on DL-SCH in the downlink slots and in the downlink symbols of flexible slots during the gap except period X.<br>period X is when ra-ResponseWindow or the ra-ContentionResolutionTimer or the msgB-ResponseWindow is running | performing SSB based measurement on measurement-object-group. |
| Gap operation 1-1 | same data-activity-action-group as Gap operation 1 | performing SSB based measurement or CSI-RS based measurement or PRS based measurement on measurement-object-group. |
| Gap operation 2 | same data-activity-action-group as Gap operation 1 | RF retuning |
| Gap operation 3 | For serving-carrier-group,<br>performing the transmission of HARQ feedback, SR, and CSI in the uplink slots and in the uplink symbols of flexible slots during the gap.<br>reporting SRS in the uplink slots and in the uplink symbols of flexible slots during the gap.<br>transmitting on UL-SCH in the uplink slots and in the | same non-data-activity-action-group as Gap operation 1-1 |

TABLE 13-continued

| Gap operation type | data-activity-action-group | non-data-activity-action-group |
|---|---|---|
| | uplink symbols of flexible slots during the gap<br>monitoring the PDCCH in the downlink slots and in the downlink symbols of flexible slots during the gap.<br>receiving on DL-SCH in the downlink slots and in the downlink symbols of flexible slots during the gap. | |
| Gap operation 4 | same data-activity-action-group as Gap operation 1 | performing paging reception or system information reception for the other USIM |
| Gap operation 6 | For serving-carrier-group, not performing the transmission of HARQ feedback, SR, and CSI in the uplink slots during the gap.<br>performing the transmission of HARQ feedback, SR, and CSI in the uplink symbols of flexible slots during the gap.<br>not reporting SRS in the uplink slots and in the uplink symbols of flexible slots during the gap.<br>reporting SRS in the in the uplink symbols of flexible slots during the gap.<br>not transmitting on UL-SCH except for Msg3 or the MSGA payload in the uplink slots and in the uplink symbols of flexible slots during the gap.<br>transmitting on UL-SCH in the uplink symbols of flexible slots during the gap.<br>monitoring the PDCCH in the downlink slots and in the downlink symbols of flexible slots during the gap.<br>receiving on DL-SCH in the downlink slots and in the downlink symbols of flexible slots during the gap. | same non-data-activity-action-group as Gap operation 1-1 |

serving-carrier-group and measurement-object-group are determined as in table

TABLE 14

| Gap Type | serving-carrier-group | measurement-object-group |
|---|---|---|
| Type1Gap | If the gap is FR2 gap, serving-carrier-group is serving carriers (or serving cells) on FR2.<br>If the gap is FR1 gap, serving-carrier-group is serving carriers (or serving cells) on FR1.<br>If the gap is UE gap, serving-carrier-group is all serving carriers (or serving cells) or serving carriers (or serving cells) on FR1 and FR2. | If the gap is FR2 gap, measurement-object-group is the measurement objects configured for FR2 frequencies.<br>If the gap is FR1 gap, measurement-object-group is the measurement objects configured for FR1 frequencies.<br>If the gap is UE gap, measurement-object-group is the measurement objects configured for FR1 frequencies and FR2 frequencies. |

TABLE 14-continued

| Gap Type | serving-carrier-group | measurement-object-group |
|---|---|---|
| Type2Gap | Same as Type1Gap | Same as Type1Gap |
| Type3Gap | Same as Type1Gap | Regardless of whether the gap is FR1 gap or FR2 gap or UE gap, measurement-object-group is determined based on the associated measurement objects. If the gap is FR2 gap, only the measurement objects on FR2 can be associated with the gap. If the gap is FR1 gap, only the measurement objects on FR1 can be associated with the gap. |
| Type4Gap | Same as Type1Gap | Same as Type1Gap |
| Type5Gap | Type5Gap is UE gap. serving-carrier-group is all serving carriers (or serving cells) or serving carriers (or serving cells) on FR1 and FR2. | Type5Gap is UE gap. measurement-object-group is the measurement objects configured for FR1 frequencies and FR2 frequencies. |
| Type6Gap | Same as Type1Gap | If the gap is FR2 gap, measurement-object-group is the serving frequencies in FR2. If the gap is FR1 gap, measurement-object-group is the serving frequencies in FR1. If the gap is UE gap, measurement-object-group is the all serving frequencies across FR1 and FR2. |

In 2A-25, GNB performs transmission and reception with the UE considering the configured gap. Type2Gap is described in more detail below.

A Type2Gap is associated with DL BWP according to the AssociatedBWP IE.

A plurality of Type2gaps can be configured for a UE. Among the gaps, UE activates a specific gap. The specific gap is the gap associated with the active DL BWP. A DL BWP and a type2gap is associated with each other if the DL BWP is indicated in the AssociatedBWP IE.

Type2Gap switching occurs when BWP switching occurs. More specifically, BWP switching occurs in the following cases.

Upon configuring Type2Gaps based on a received RRCReconfiguration message, UE activates a Type2Gap associated with a DL BWP to be activated after RRC reconfiguration. If firstActiveDownlinkBWP is present in the RRCReconfiguration message, the DL BWP to be activated is the DL BWP indicated by firstActiveDownlinkBWP-Id in the RRCReconfiguration message. If firstActiveDownlinkBWP-Id is absent in the RRCReconfiguration message, the DL BWP to be activated in the DL BWP that was active before RRCReconfiguration message is received.

After activating a Type2Gap, UE may need to do gap switching (i.e., UE may need to deactivate the current active Type2Gap and to activate a new Type2Gap). For example, if UE receives uplink grant on PDCCH (DCI format 0_1 or 0_2) including a bandwidthpart indicator field indicating an UL BWP different from the current active UL BWP, UE determines that gap switching is needed if condition 1 and condition 2 are fulfilled.

Condition 1: If the SpCell of the UE is in unpaired spectrum (i.e., TDD spectrum); and Condition 2: If the Type2Gap associated with the old DL BWP (DL BWP that is active before reception of the UL grant on PDCCH) is different from the Type2Gap associated with the DL BWP having the same BWP id as the UL BWP indicated by the bandwidthpart indicator of the UL grant If both conditions are fulfilled, UE deactivates the current Type2Gap and activates the Type2Gap associated with the DL BWP having the same BWP id as the UL BWP indicated by the bandwidthpart indicator of the UL grant. If no Type2Gap is associated with the DL BWP, no Type2Gap is activated.

If UE receives DL assignment on PDCCH (DCI format 1_1 or 1_2), UE determines gap switching is needed if condition 3 is fulfilled.

Condition 3: If the Type2Gap associated with the old DL BWP is different from the Type2Gap associated with the DL BWP indicated by the bandwidthpart indicator of the DL assignment If condition 3 is fulfilled, UE deactivates the current Type2Gap and activates the Type2Gap associated with the DL BWP indicated by the bandwidthpart indicator of the DL assignment. If no Type2Gap is associated with the DL BWP, no Type2Gap is activated.

If the bwp-InactivityTimer associated with the active DL BWP expires, UE determines gap switching is needed if condition 4 is fulfilled.

condition 4: If the Type2Gap associated with the active DL BWP (old DL BWP) is different from the Type2Gap associated with the DL BWP to be activated If defaultDownlinkBWP-Id is configured, The DL BWP to be activated is the DL BWP indicated by the defaultDownlinkBWP-Id.

If defaultDownlinkBWP-Id is not configured, The DL BWP to be activated is the DL BWP indicated by the initialDownlinkBWP.

If condition 4 is fulfilled, UE deactivates the current Type2Gap and activates the Type2Gap associated with the DL BWP to be activated. If no Type2Gap is associated with the DL BWP to be activated, no Type2Gap is activated.

If Random Access procedure is initiated on a serving cell, UE determines gap switching is needed if condition 5 and condition 6 are fulfilled.

Condition 5: If PRACH occasions are not configured for the active UL BWP and if the serving cell is SpCell Condition 6: If the Type2Gap associated with the active DL BWP (old DL BWP) is different from the Type2Gap associated with the DL BWP indicated by initialDownlinkBWP If condition 5 and 6 are fulfilled, UE deactivates the current Type2Gap and activates the Type2Gap associated with the DL BWP indicated by initialDownlinkBWP. If no Type2Gap is associated with the initial DL BWP, no Type2Gap is activated.

Alternatively, a Type2Gap is configured by GapConfig.

Type2GapIndicator can be included in a GapConfig. If the Type2GapIndicator is set to “true”, a type2Gap is configured according to the GapConfig. If Type2GapIndicator is not included in the GapConfig, either type1Gap or type4Gap is configured according to the GapConfig.

One UE-Type2gap or one FR1-Type2gap or one FR2-Type2gap or one FR1-Type2gap and one FR2-Type2gap can be configured for the UE.

If Type2GapStatus of the active DL BWP of the PCell is set to a first value (e.g., deactivated), UE deactivates the Type2Gap for the PCell.

If Type2GapStatus of the active DL BWP of the PCell is set to a second value (e.g., activated), or if Type2GapStatus is not included in the BWP-DownlinkDedicated of the active BWP, UE activates the Type2Gap for the PCell.

The other way is also possible.

If Type2GapStatus of the active DL BWP of the PCell is set to a first value (e.g., activated), UE activates the Type2Gap for the PCell.

If Type2GapStatus of the active DL BWP of the PCell is set to a second value (e.g., deactivated), or if Type2GapStatus is not included in the BWP-DownlinkDedicated of the active BWP, UE deactivates the Type2Gap for the PCell.

Type2Gap status switching occurs when BWP switching occurs. More specifically, BWP switching occurs in the following cases.

Upon configuring Type2Gaps based on a received RRCReconfiguration message, UE activates a Type2Gap based on the Type2GapStatus of the DL BWP to be activated after RRC reconfiguration.

If firstActiveDownlinkBWP is present in the RRCReconfiguration message, the DL BWP to be activated is the DL BWP indicated by firstActiveDownlinkBWP-Id in the RRCReconfiguration message.

If firstActiveDownlinkBWP is present and If BWP-DownlinkDedicated of DL BWP indicated by firstActiveDownlinkBWP-Id includes Type2GapStatus and if Type2GapStatus is set to a first value, UE deactivates the type2Gap on the PCell at first point of time.

If firstActiveDownlinkBWP is present and If BWP-DownlinkDedicated of DL BWP indicated by firstActiveDownlinkBWP-Id does not include Type2GapStatus, UE activates the type2Gap on the PCell at first point of time.

If firstActiveDownlinkBWP is present and If BWP-DownlinkDedicated of DL BWP indicated by firstActiveDownlinkBWP-Id includes Type2GapStatus and if Type2GapStatus is set to a second value, UE activates the type2Gap on the PCell at first point of time.

If firstActiveDownlinkBWP is absent in the RRCReconfiguration message, the DL BWP to be activated is the initial DL BWP. Common configuration of the initial DL BWP is provided in SIB1 and dedicate configuration of the initial DL BWP is provided in the RRCReconfiguration message.

If firstActiveDownlinkBWP is absent and If BWP-DownlinkDedicated of the initial DL BWP includes Type2GapStatus set to a first value, UE deactivates the type2Gap on the PCell at first point of time.

If firstActiveDownlinkBWP is absent and If BWP-DownlinkDedicated of the initial DL BWP does not include Type2GapStatus, UE activates the type2Gap on the PCell at first point of time.

If firstActiveDownlinkBWP is absent and If BWP-DownlinkDedicated of the initial DL BWP includes Type2GapStatus set to a second value, UE activates the type2Gap on the PCell at first point of time.

The initial DL BWP is the BWP of which BWP-id is 0. The initial DL BWP is the BWP of which BWP-id is implicitly configured. The initial BWP is the BWP of which BWP-id is not associated with an explicit BWP-Id IE. The initial DL BWP is the BWP of which cell specific configuration is provided in SIB1 and UE specific configuration is provided in RRCReconfiguration message. DL BWPs other than the initial BWP are the BWP of which cell specific configuration and UE specific configuration are provided in RRCReconfiguration message.

After activating a Type2Gap, UE may need to do gap status switching. For example, if UE receives uplink grant on PDCCH (DCI format 0_1 or 0_2) including a bandwidthpart indicator field indicating an UL BWP different from the current active UL BWP, and if condition 1 and condition 2-1 are fulfilled, UE activates the currently inactive type2Gap at second point of time.

Condition 1: If the SpCell of the UE is in unpaired spectrum (i.e., TDD spectrum); and Condition 2-1: If BWP-DownlinkDedicated of DL BWP indicated by the bandwidthpart indicator of the UL grant includes type2GapStatus and if the type2GapStauts indicates a first value.

Alternative condition 2-1: If BWP-DownlinkDedicated of DL BWP indicated by the bandwidthpart indicator of the UL grant does not includes type2GapStatus.

If UE receives uplink grant on PDCCH (DCI format 0_1 or 0_2) including a bandwidthpart indicator field indicating an UL BWP different from the current active UL BWP, and if condition 1 and condition 2-2 are fulfilled, UE deactivates the currently active type2Gap at second point of time.

Condition 2-2: If BWP-DownlinkDedicated of DL BWP indicated by the bandwidthpart indicator of the UL grant includes type2GapStatus and if the type2GapStauts indicates a second value If UE receives DL assignment on PDCCH (DCI format 1_1 or 1_2) including a bandwidthpart indicator field indicating a DL BWP different from the current active DL BWP and if condition 3-1 is fulfilled, UE activates the currently inactive type2Gap at second point of time.

Condition 3-1: If BWP-DownlinkDedicated of DL BWP indicated by the bandwidthpart indicator of the DL assignment includes type2GapStatus and if the type2GapStauts indicates a first value.

Alternative condition 3-1: If BWP-DownlinkDedicated of DL BWP indicated by the bandwidthpart indicator of the DL assignment does not includes type2GapStatus.

If UE receives DL assignment on PDCCH (DCI format 1_1 or 1_2) including a bandwidthpart indicator field indicating a DL BWP different from the current active DL BWP and if condition 3-2 is fulfilled, UE deactivates the currently active type2Gap at second point of time.

Condition 3-2: If BWP-DownlinkDedicated of DL BWP indicated by the bandwidthpart indicator of the DL assignment includes type2GapStatus and if the type2GapStauts indicates a second value.

If the bwp-Inactivity Timer associated with the active DL BWP expires and if type2Gap is inactive (i.e., BWP-DownlinkDedicated of the active BWP include type2GapStatus and type2GapStatus indicates a second value) and if defaultDownlinkBWP-Id is configured for SpCell and if condition 4-1 is fulfilled, UE activates the currently inactive type2Gap at second point of time.

Condition 4-1: If BWP-DownlinkDedicated of DL BWP indicated by the defaultDownlinkBWP-Id includes type2GapStatus and if the type2GapStauts indicates a first value.

Alternative condition 4-1: If BWP-DownlinkDedicated of DL BWP indicated by the defaultDownlinkBWP-Id does not includes type2GapStatus.

If the bwp-Inactivity Timer associated with the active DL BWP expires and if type2Gap is active (i.e., BWP-DownlinkDedicated of the active DL BWP does not include type2GapStatus) and if defaultDownlinkBWP-Id is configured for SpCell and if condition 4-2 is fulfilled, UE deactivates the currently active type2Gap at second point of time.

Condition 4-2: If BWP-DownlinkDedicated of DL BWP indicated by the defaultDownlinkBWP-Id includes type2GapStatus and if the type2GapStauts indicates a second value.

If the bwp-InactivityTimer associated with the active DL BWP expires and if type2Gap is inactive (i.e., BWP-DownlinkDedicated of the active BWP include type2GapStatus and type2GapStatus indicates a second value and if defaultDownlinkBWP-Id is not configured for SpCell and if condition 4-3 is fulfilled, UE activates the currently inactive type2Gap at second point of time.

Condition 4-3: If BWP-DownlinkDedicated of the initial DL BWP includes type2GapStatus and if the type2GapStauts indicates a first value.

Alternative condition 4-3: If BWP-DownlinkDedicated of the initial DL BWP does not includes type2GapStatus.

If the bwp-InactivityTimer associated with the active DL BWP expires and if type2Gap is active (i.e., BWP-DownlinkDedicated of the active DL BWP does not include type2GapStatus) and if defaultDownlinkBWP-Id is not configured for SpCell and if condition 4-4 is fulfilled, UE deactivates the currently active type2Gap at second point of time.

Condition 4-4: If BWP-DownlinkDedicated of the initial DL BWP includes type2GapStatus and if the type2GapStauts indicates a second value.

If Random Access procedure is initiated on a serving cell, and if condition 5 and condition 4-3 are fulfilled UE activates the currently inactive type2Gap at second point of time.

Condition 5: If PRACH occasions are not configured for the active UL BWP and if the serving cell is SpCell If Random Access procedure is initiated on a serving cell, and if condition 5 and condition 4-4 are fulfilled UE deactivates the currently active type2Gap at second point of time.

The first point of time is when a first processing delay has passed since the corresponding RRCReconfiguration message is received. The first processing delay is processing delay for RRC procedure and 10 ms.

The second point of time is when a second processing delay has passed since DCI is received or since bwp-Inactivity Timer expires.

The second processing delay is dependent to SCS of specific two BWPs. The specific two BWPs are the BWP before BWP switch and the BWP after BWP switch. The second processing delay is 1 ms if the smaller SCS between the SCS before BWP switch and the SCS after BWP switch is 15 kHz or 30 kHz. The second processing delay is 0.75 ms if the smaller SCS between the SCS before BWP switch and the SCS after BWP switch is 60 kHz or 120 kHz.

The BWP before BWP switch is the active BWP when DCI is received or when bwp-InactivityTimer expires. The BWP after BWP switch is the active BWP when second processing delay elapsed since DCI was received or since bwp-Inactivity Timer expired.

Type6Gap is described in more detail below.

The length of the type6Gap is determined based on type6GapLength field and type6GapRefServCellIndicator field. UE first determines the number of uplink slots from the gap length indicated by the type6GapLength field and the SCS of the serving cell indicated by type6GapRefServCellIndicator. For example, if the gap length is 0.5 ms and UL SCS of the reference serving cell is 60 KHz, the number of slots for a type6Gap is 2 (=gap length/slot length of the reference serving cell).

Type6Gap starts in the nearest uplink slot from the reference subframe. Type6Gap continues for consecutive n uplink slots. Depending on tdd-UL-DL-ConfigurationCommon, DL slots and flexible slots can exists between uplink slots (or within time span of uplink slots). Hence the actual length of type6Gap is determined by the number of uplink slots derived from type6GapLength field and the number of downlink slots that exist within the time span of the uplink slots and the number of flexible slots that exist within the time span of the uplink slots. UE performs normal downlink operation in the downlink slots and flexible slots within the Type6Gap. UE performs normal uplink operation in the flexible slots within the Type6Gap. UE stops any uplink operation in the uplink slots within the Type6Gap. UE does not perform uplink transmission of FR1 serving cells in the uplink slots during FR1 type6Gap. UE does not perform uplink transmission of FR2 serving cells in the uplink slots during FR2 type6Gap. UE does not perform uplink transmission of all serving cells in the uplink slots during UE type6Gap.

FIG. 3 illustrates the operation of the terminal.

In step 3A-11, terminal transmits a UECapabilityInformation message including a plurality of first single-valued IEs indicating whether the terminal supports type2Gap to the base station. Each of the plurality of first single-valued IEs indicates whether type2Gap is supported in the corresponding frequency band.

In step 3A-13, terminal receives a first message including information about a gap request including a plurality of frequency band indicators and a second single value IE from the base station.

In step 3A-15, terminal transmits a second message including gap-related information to the base station. The gap-related information includes needForGapInfoNR and needForGapInfoNR3, needForGapInfoNR indicates whether a gap is required for the frequency band, needForGapInfoNR3 indicates whether a gap is required for downlink BWP. needForGapInfoNR is included in the first extension part. needForGapInfoNR3 is included in the second extension part. The second extension is located immediately after the first extension.

In step 3A-17, terminal receives a third message including information for gap configuration from the base station. The information for configuring the gap includes a bitmap and a multi-value IE, each bit of the bitmap indicates whether the gap is active when the corresponding DL BWP is active. A multi-value IE indicates one of SSB measurement and CSI-RS measurement and PRS measurement.

In step 3A-19, terminal sets up a gap based on the gap configuration information.

In step 3A-21, terminal performs gap-action-1 during the gap.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2 and FIG. 3 are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller 4B-01 controls transceiver, storage unit and backhaul interface such that base station operation illustrated in FIG. 2 are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method by a terminal, the method comprising:

receiving, by the terminal from a base station, a Radio Resource Control (RRC) message, wherein the RRC message comprises a measurement gap configuration Information Element (IE), wherein the measurement gap configuration IE comprises:

a first parameter indicating a length of a measurement gap;

a second parameter indicating a periodicity of the measurement gap; and a third parameter related to a specific set of serving cells associated with the measurement gap, establishing, by the terminal, the measurement gap, wherein the measurement gap has:

the length indicated by the first parameter; and the periodicity indicated by the second parameter;

determining, by the terminal, whether to activate the measurement gap; and performing, by the terminal and during the measurement gap in case that the measurement gap is activated, an uplink related operation and a downlink related operation, wherein, for the uplink related operation during the measurement gap, the terminal:

performs Uplink Shared Channel (UL-SCH) transmission for Msg 3 in the specific set of serving cells associated with the measurement gap; and does not perform Sounding Reference Signal (SRS) transmission in the specific set of serving cells associated with the measurement gap, wherein, for the downlink related operation during the measurement gap, the terminal performs Synchronization Signal Block (SSB) measurement on a specific set of measurement objects, and wherein the specific set of serving cells associated with the measurement gap is determined based on the third parameter.

2. The method of claim 1, wherein the specific set of measurement objects is determined based on the third parameter.

3. The method of claim 1, wherein the measurement gap is activated in case that:

a specific Bandwidth Part (BWP) is activated;

a fourth parameter related to the specific BWP and the measurement gap is present in a configuration parameter set of the specific BWP; and the fourth parameter is set to a value.

4. The method of claim 3, wherein the measurement gap is not activated in case that:

the specific BWP is activated; and the fourth parameter related to the specific BWP and the measurement gap is not present in the configuration parameter set of the specific BWP.

5. The method of claim 3, wherein the specific BWP is determined based on a parameter indicating downlink BWP that is to be activated after the RRC message is received.

6. The method of claim 3, wherein the configuration parameter set of the specific BWP is comprised in the RRC message.

7. The method of claim 3, wherein the fourth parameter:

indicates measurement gap status; and is comprised in the RRC message.

8. The method of claim 1, wherein the third parameter indicates one of:

a first value corresponding to a first set of serving cells;

a second value corresponding to a second set of serving cells; or a third value corresponding to a third set of serving cells.

9. The method of claim 8, wherein:

the first set of serving cells comprises serving cells on Frequency Range 1 (FR1);

the second set of serving cells comprises serving cells on Frequency Range 1 (FR2); and the third set of serving cells comprises serving cells on FR1 and serving cells on FR2.

10. The method of claim 8, wherein:

the first value corresponds to a first set of measurement objects;

the second value corresponds to a second set of measurement objects; and the third value corresponds to a third set of measurement objects.

11. The method of claim 10, wherein:

the first set of measurement objects comprises measurement objects on FR1;

the second set of measurement objects comprises measurement objects on FR2; and the third set of measurement objects comprises measurement objects on FR1 and measurement objects on FR2.

12. The method of claim 1, wherein the terminal performs measurement on Positioning Reference Signal (PRS) during the measurement gap in case that the measurement gap configuration IE comprises a fifth parameter.

13. The method of claim 12, wherein the fifth parameter indicates that the measurement gap relates to PRS measurement.

14. The method of claim 1, wherein, for the downlink related operation during the measurement gap, the terminal does not monitor Physical Downlink Control Channel (PDCCH) of the specific set of serving cells associated with the measurement gap.

15. The method of claim 1, the method further comprising:

receiving, by the terminal from the base station, a second RRC message, wherein the second RRC message comprises a second measurement gap configuration Information Element (IE), wherein the second measurement gap configuration IE comprises:

a sixth parameter indicating a length of the second measurement gap; and a seventh parameter indicating a periodicity of the second measurement gap;

establishing, by the terminal, the second measurement gap, wherein the second measurement gap has:

the length indicated by the sixth parameter; and the periodicity indicated by the seventh parameter;

determining, by the terminal, to activate the second measurement gap;

performing, by the terminal and during the second measurement gap, the uplink related operation and the downlink related operation:

wherein, for the uplink related operation during the second measurement gap, the terminal:

performs Uplink Shared Channel (UL-SCH) transmission for Msg 3 in a second specific set of serving cells associated with the second measurement gap; and does not perform Sounding Reference Signal (SRS) transmission in the second specific set of serving cells associated with the second measurement gap, wherein, for the downlink related operation during the second measurement gap, the terminal performs Synchronization Signal Block (SSB) measurement on a second specific set of measurement objects associated with the second measurement gap, and wherein the second specific set of serving cells associated with the second measurement gap is determined based on field that comprises the second measurement gap configuration IE.

16. The method of claim 15, wherein the second specific set of serving cells associated with the second measurement gap are:

a first set of serving cells in case that the second measurement gap configuration IE is comprised in a first field;

a second set of serving cells in case that the second measurement gap configuration IE is comprised in a second field; and a third set of serving cells in case that the second measurement gap configuration IE is comprised in a third field.

17. The method of claim 16, wherein:

the first set of serving cells comprises serving cells on Frequency Range 1 (FR1);

the second set of serving cells comprises serving cells on Frequency Range 2 (FR2); and the third set of serving cells comprises serving cells on FR1 and serving cells on FR2.

18. The method of claim 15, wherein the second specific set of measurement objects associated with the second measurement gap are:

a first set of measurement objects in case that the second measurement gap configuration IE is comprised in a first field;

a second set of measurement objects in case that the second measurement gap configuration IE is comprised in a second field; and a third set of measurement objects in case that the second measurement gap configuration IE is comprised in a third field.

19. The method of claim 18, wherein:

the first set of measurement objects comprises measurement objects on Frequency Range 1 (FR1);

the second set of measurement objects comprises measurement objects on FR2; and the third set of measurement objects comprises measurement objects on FR1 and measurement objects on FR2.

20. A terminal in a wireless communication system, the terminal comprising:

a transceiver configured to transmit and receive a signal, and a controller configured to control the transceiver to:

receive from a base station, a Radio Resource Control (RRC) message, wherein the RRC message comprises a measurement gap configuration Information Element (IE), wherein the measurement gap configuration IE comprises:

a first parameter indicating a length of a measurement gap;

a second parameter indicating a periodicity of the measurement gap; and a third parameter related to a specific set of serving cells associated with the measurement gap, establish the measurement gap, wherein the measurement gap has:

the length indicated by the first parameter; and the periodicity indicated by the second parameter, determine whether to activate the measurement gap, and perform, during the measurement gap in case that the measurement gap is activated, an uplink related operation and a downlink related operation:

wherein, for the uplink related operation during the measurement gap, the terminal:

performs Uplink Shared Channel (UL-SCH) transmission for Msg 3 in the specific set of serving cells associated with the measurement gap; and does not perform Sounding Reference Signal (SRS) transmission in the specific set of serving cells associated with the measurement gap, wherein, for the downlink related operation during the measurement gap, the terminal performs Synchronization Signal Block (SSB) measurement on a specific set of measurement objects, and wherein the specific set of serving cells associated with the measurement gap is determined based on the third parameter.

* * * * *